(12) United States Patent
Kanno

(10) Patent No.: US 8,468,058 B2
(45) Date of Patent: Jun. 18, 2013

(54) ADVERTISEMENT DISTRIBUTION SYSTEM, DEVICE AND METHOD, AND ADVERTISEMENT DISTRIBUTION PROGRAM

(75) Inventor: Takeshi Kanno, Tokyo (JP)

(73) Assignees: Kannax Co., Tokyo (JP); Mekiki Creates Co., Ltd., Tokyo (JP)

( * ) Notice: Subject to any disclaimer, the term of this patent is extended or adjusted under 35 U.S.C. 154(b) by 0 days.

(21) Appl. No.: 13/406,278

(22) Filed: Feb. 27, 2012

(65) Prior Publication Data

US 2013/0060630 A1 Mar. 7, 2013

Related U.S. Application Data

(62) Division of application No. 12/064,538, filed as application No. PCT/JP2006/323596 on Nov. 27, 2006, now Pat. No. 8,150,733.

(30) Foreign Application Priority Data

Jan. 30, 2006 (JP) .................................. 2006-020042

(51) Int. Cl.
*G06Q 30/00* (2012.01)
(52) U.S. Cl.
USPC ................... 705/14.66; 705/14.52; 705/14.49
(58) Field of Classification Search
USPC .................................. 705/14.66, 14.52, 14.49
See application file for complete search history.

(56) References Cited

U.S. PATENT DOCUMENTS

| | | | |
|---|---|---|---|
| 6,182,050 B1 | 1/2001 | Ballard | 705/14.61 |
| 6,714,975 B1 | 3/2004 | Aggarwal et al. | 705/14.43 |
| 2003/0023489 A1 | 1/2003 | McGuire et al. | 705/14 |
| 2004/0044571 A1 | 3/2004 | Bronnimann et al. | 705/14 |
| 2005/0203796 A1 | 9/2005 | Anand et al. | 705/14 |
| 2006/0041553 A1 | 2/2006 | Paczkowski et al. | 707/7 |
| 2006/0242013 A1 | 10/2006 | Agarwal et al. | 705/14 |
| 2008/0091524 A1 | 4/2008 | Yan et al. | 705/14 |

FOREIGN PATENT DOCUMENTS

| | | |
|---|---|---|
| JP | 2001-236444 | 8/2001 |
| JP | 2002-007462 | 1/2002 |
| JP | 2002-056280 | 2/2002 |
| JP | 2002-092475 | 3/2002 |
| JP | 2002-132822 | 5/2002 |
| JP | 2002-230391 | 8/2002 |
| JP | 2002-232935 | 8/2002 |

(Continued)

OTHER PUBLICATIONS

English translation of Japanese Office Action for application No. JP 2006-020042 dated Mar. 20, 2007.

(Continued)

*Primary Examiner* — Michael Bekerman
(74) *Attorney, Agent, or Firm* — DLA Piper LLP (US)

(57) ABSTRACT

An advertisement transmitted from an advertisement distributor terminal and advertisement distribution request information are mutually associated and stored in an advertisement distribution management device. Further, user information transmitted from the user terminal is added with identification information, and stored in the advertisement distribution management device. Thereafter, the advertisement distribution management device acquires user identification information in response to a Web site reading requirement transmitted from the user terminal, and extracts all category information belonged to by advertisements the distribution of which are approved by the user with reference to a user information is determined out of the category information. Furthermore, one advertisement is determined out of the advertisements that belong to the category information, and the advertisement is transmitted to the user terminal.

5 Claims, 16 Drawing Sheets

FOREIGN PATENT DOCUMENTS

| | | |
|---|---|---|
| JP | 2002-366834 | 12/2002 |
| JP | 2003-016334 | 1/2003 |
| JP | 3101704 U | 3/2004 |
| JP | 2004-332274 | 11/2004 |
| JP | 2004-334274 | 11/2004 |
| JP | 2005-078497 | 3/2005 |

OTHER PUBLICATIONS

English translation of Japanese Office Action for application No. JP 2006-020042 dated Mar. 13, 2006.

A framework for targeting banner advertising on the Internet, Gallagher, K. Parsons, J., Nunumaker, J.F., Jr., Sprague, R. H., Jr. Fac of Bus. Adm., Memorial Univ. of Newfoundland, St. John's Nfld, Canada, Jan. 1997.

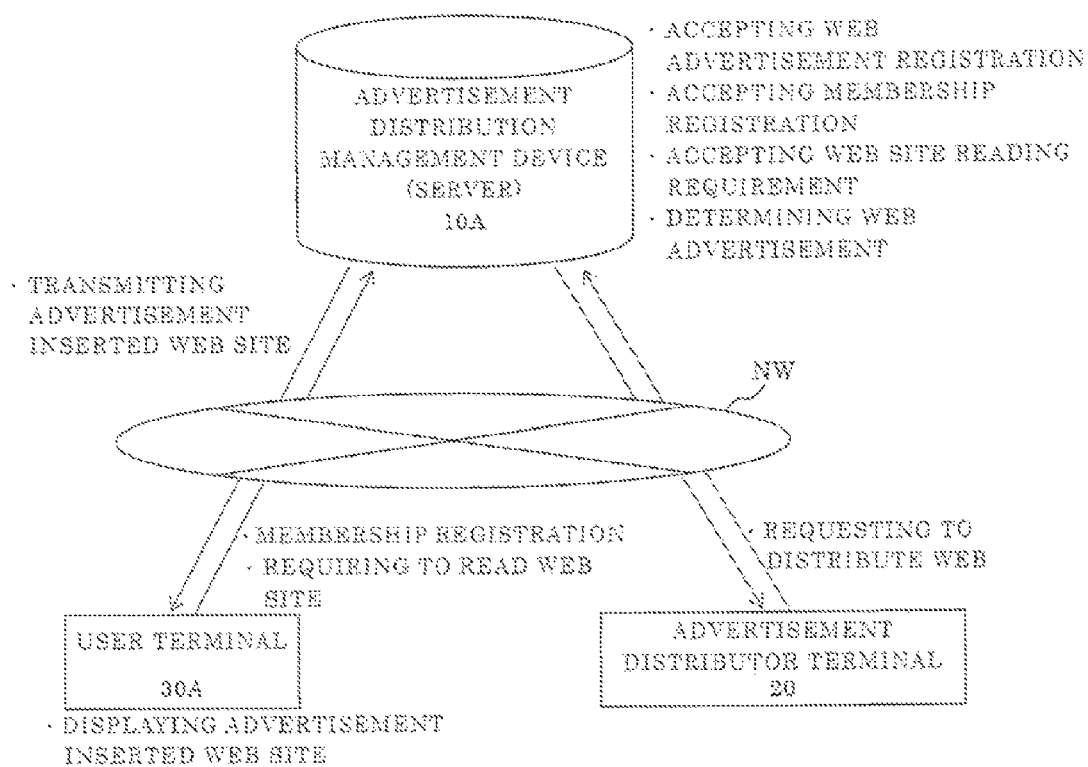

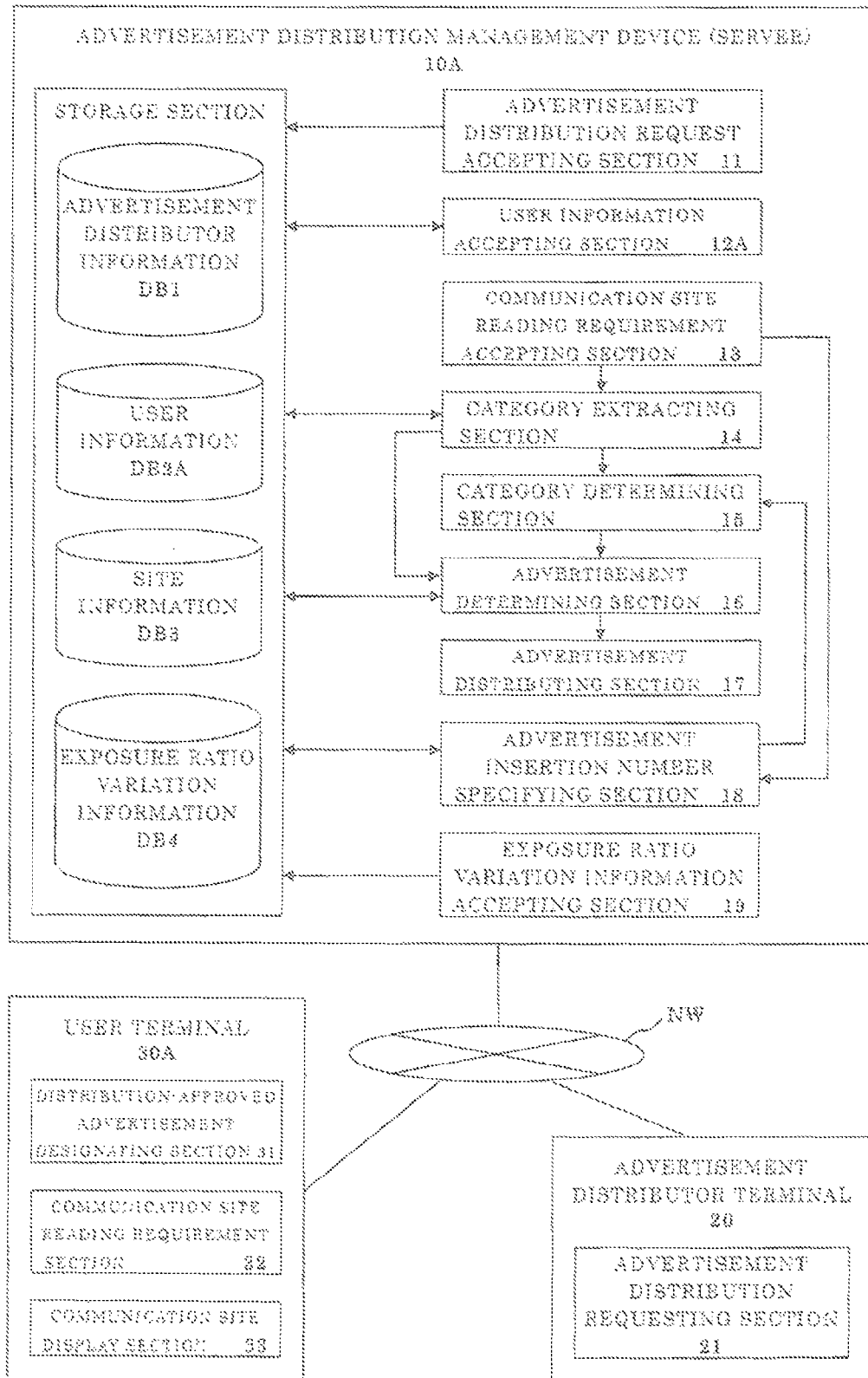

Figure 3

ADVERTISEMENT DISTRIBUTOR INFORMATION DB

| ADVERTIS EMENT ID | ADVERTISEMENT INFORMATION | CATEGORY SECTION 1 | CATEGORY SECTION 2 | SEX | AGE 1 | AGE 2 | DISTRIBU TION AREA | ... |
|---|---|---|---|---|---|---|---|---|
| CM001 | CM001.html | A | 100 | 0 | 16 | 30 | 310 | ... |
| CM002 | CM002.html | B | 201 | 1 | 00 | 00 | 200 | ... |
| . | . | . | . | . | . | . | . | . |
| . | . | . | . | . | . | . | . | . |

* IN SEX, MALE = 1, FEMALE = 2, NOT RESTRICTED = 0
* AGE 1 DENOTES LOWER LIMIT AGE, AGE 2 LIMITS UPPER LIMIT AGE, 00 = NOT RESTRICTED)

Figure 4

(A) CATEGORY 1

| CATEGORY | SECTION 1 |
|---|---|
| A A A | A |
| B B B | B |
| C C C | C |
| D D D | D |
| E E E | E |
| . | . |

(B) CATEGORY 2

| CATEGORY SECTION 1 | CATEGORY | SECTION 2 |
|---|---|---|
| A | NOT RESTRICTED | 100 |
| | a a a | 101 |
| | a a b | 102 |
| | a a c | 103 |
| | . | . |
| | . | . |
| B | NOT RESTRICTED | 200 |
| | b b a | 201 |
| | b b b | 202 |
| | b b c | 203 |
| | . | . |
| | . | . |
| . | . | . |
| . | . | . |

Figure 5

DISTRIBUTION AREA SECTION

| DISTRIBUTION AREA | | SECTION |
|---|---|---|
| NOT RESTRICTED | | 000 |
| A A | WHOLE AREA | 100 |
| | a a | 110 |
| | a b | 120 |
| | . | . |
| | . | . |
| B B | WHOLE AREA | 200 |
| | b a | 210 |
| | b b | 220 |
| | . | . |
| | . | . |
| C C | WHOLE AREA | 300 |
| | c a | 310 |
| | c b | 320 |
| | . | . |
| . | . | . |
| . | . | . |

Figure 6

USER INFORMATION DB

| USER ID | CATEGORY SECTION 1 | CATEGORY SECTION 2 | SEX | AGE | RESIDENTIAL AREA |
|---|---|---|---|---|---|
| CU001 | A | 101 | 1 | 25 | 310 |
| CU002 | B | 202 | 2 | 18 | 210 |
| . | . | . | . | . | . |

Figure 7

SITE INFORMATION DB

| SITE ID | URL INFORMATION | THE NUMBER OF ADVERTISEMENT INSERTION FRAMES |
|---|---|---|
| HP001 | http://www.abc.co.jp/ | 2 |
| HP002 | http://www.aaa.com/ | 1 |
| . | . | . |

Figure 8

EXPOSURE RATIO VARIATION INFORMATION DB

| ADVERTISEMENT DISTRIBUTOR ID | ADVERTISEMENT ID | EXPOSURE RATIO VARIATION INFORMATION |
|---|---|---|
| CL001 | CM001 | 2 |
| CL002 | CM002 | 1 |
| . | . | . |
| . | . | . |

Figure 17

SITE MANAGER INFORMATION DB

| SITE MANAGER ID | SITE ID | URL INFORMATION |
|---|---|---|
| SC001 | HP001 | http://www.abc.co.jp/ |
| SC002 | HP002 | http://www.asa.com/ |
| . | . | . |
| . | . | . |

| CATEGORY SECTION 1 | CATEGORY SECTION 2 | SEX | AGE | RESIDENTIAL AREA | . . . |
|---|---|---|---|---|---|
| A | 101 | 0 | 00 | 000 | . . |
| B | 202 | 0 | 00 | 000 | . . |
| . | . | . | . | . | . |
| . | . | . | . | . | . |

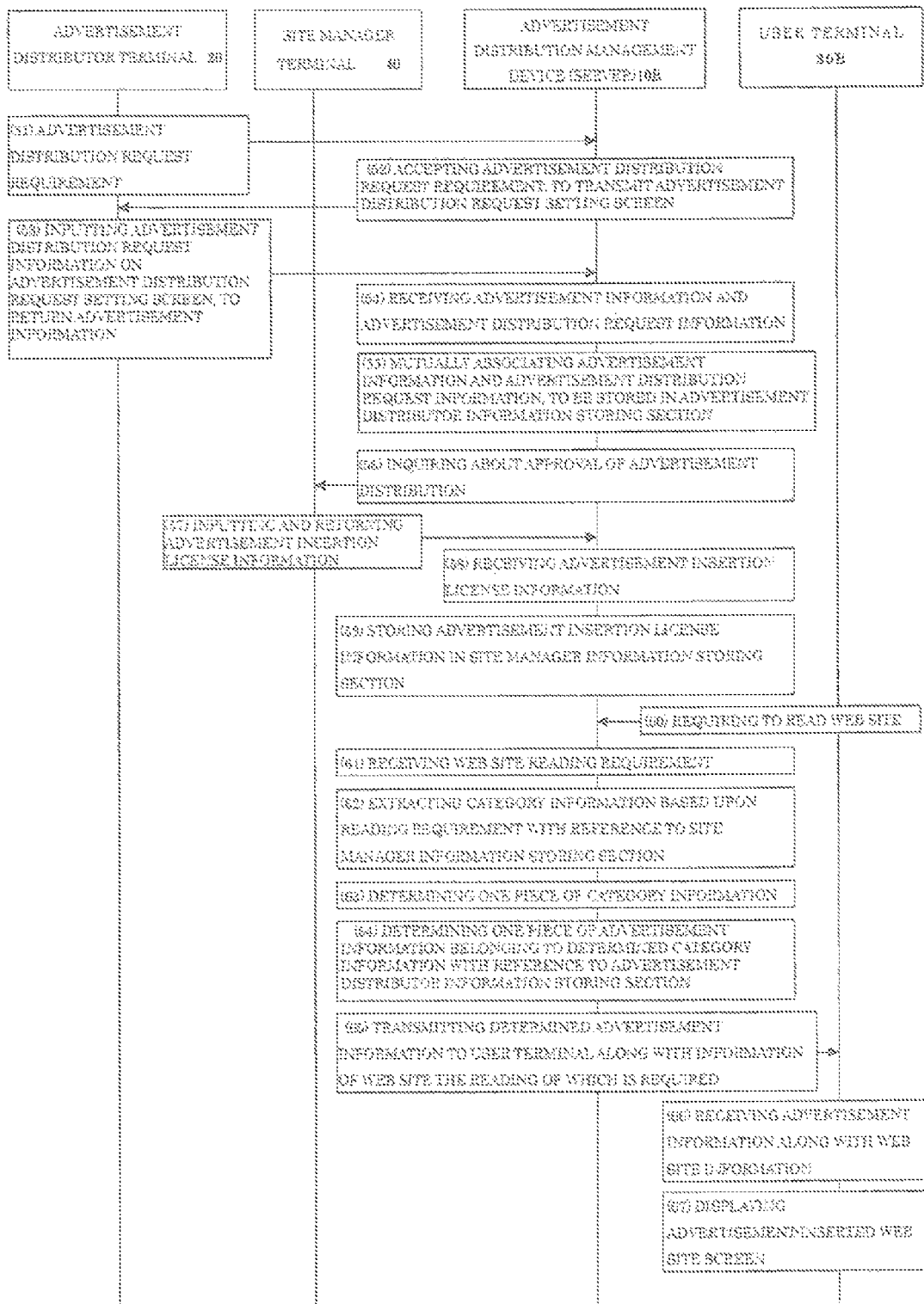

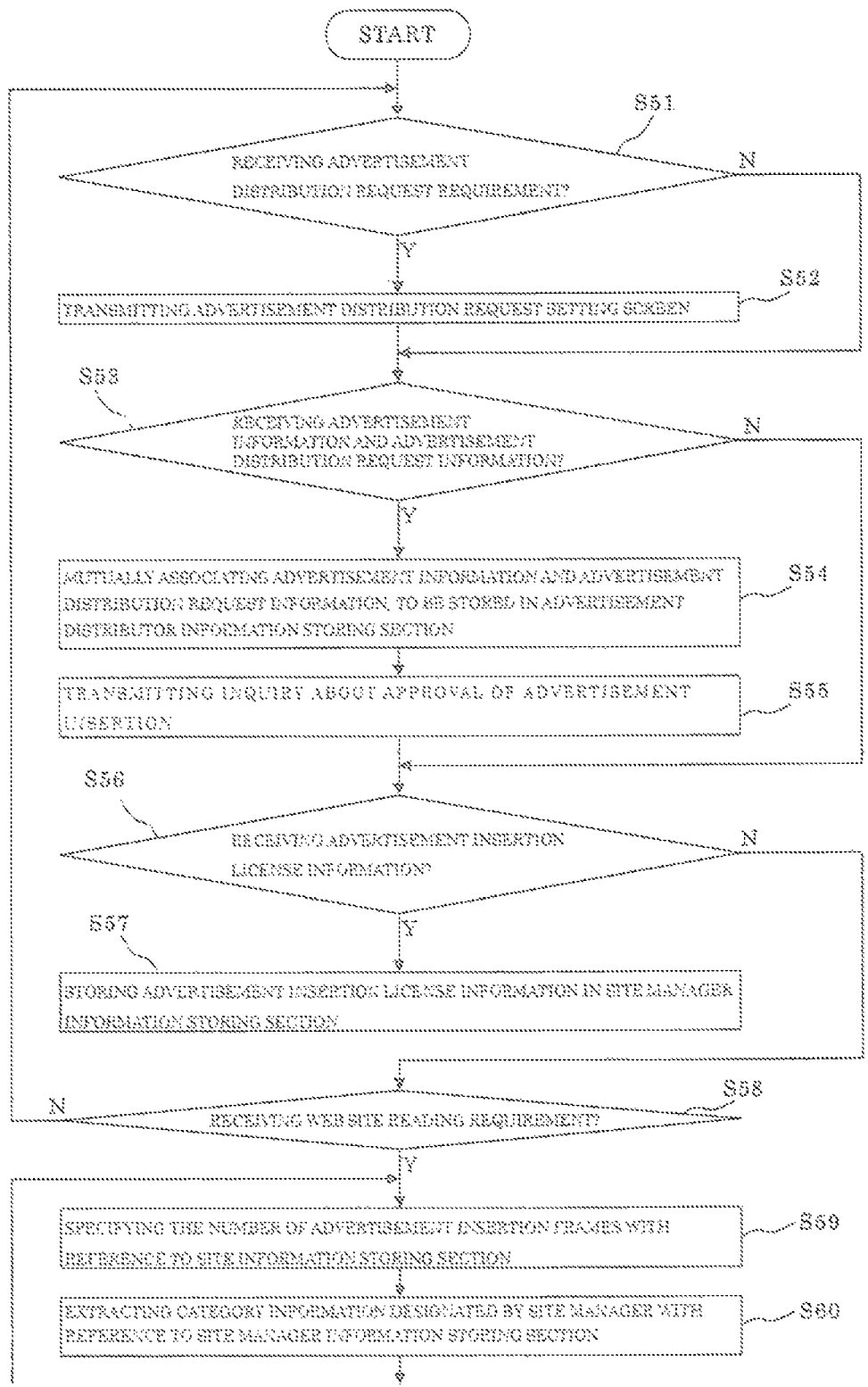

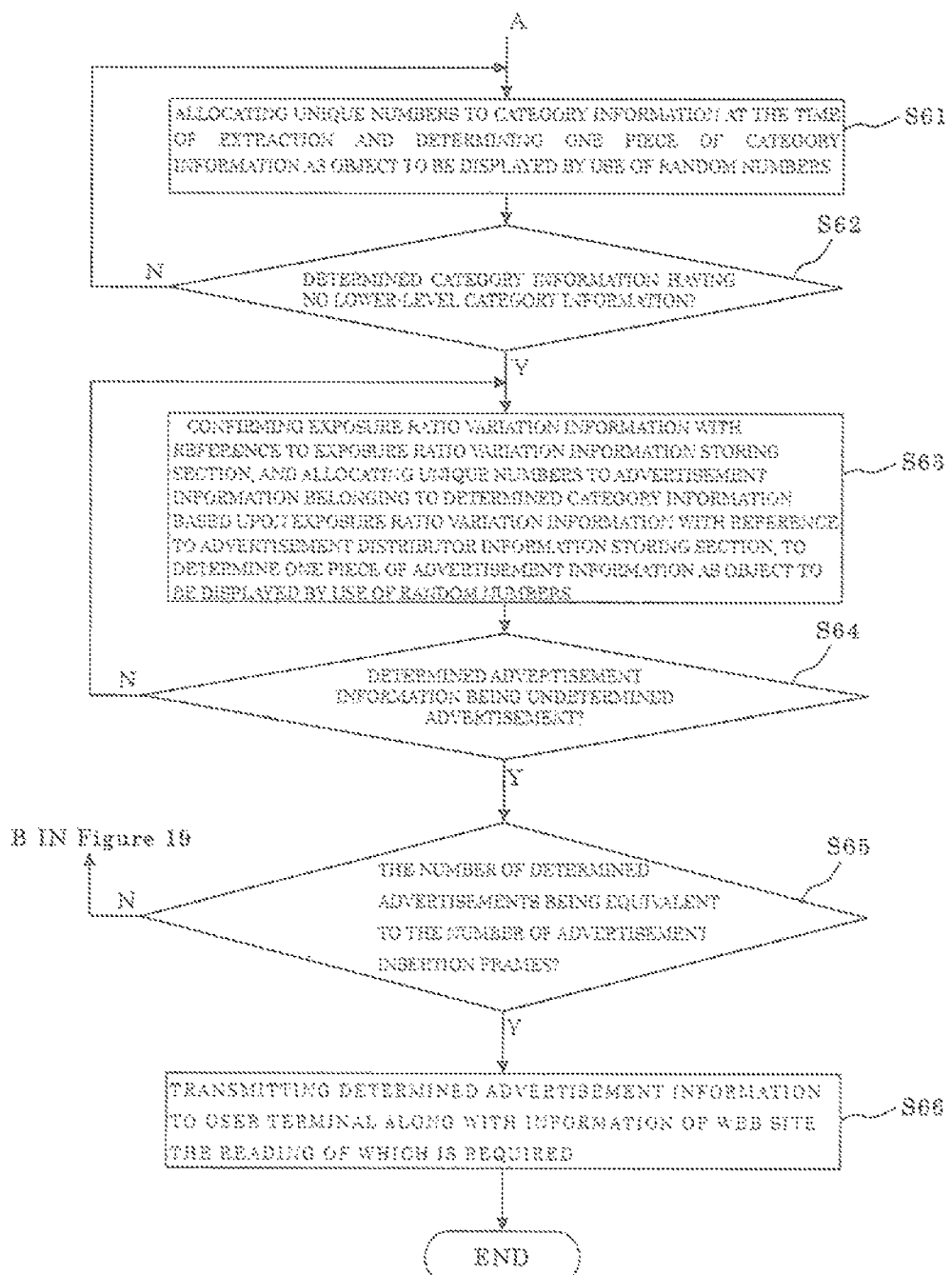

ADVERTISEMENT DISTRIBUTION SYSTEM, DEVICE AND METHOD, AND ADVERTISEMENT DISTRIBUTION PROGRAM

This is a divisional application of application Ser. No. 12/064,538 filed Feb. 22, 2008, now U.S. Pat No. 8,150,733 which in turn is a national phase application of PCT/JP2006/323596 filed Nov. 27, 2006, which in turn claims the benefit of Japanese application 2006-020042 filed Jan. 30, 2006. All of the applications mentioned here are incorporated by reference in their entirety.

TECHNICAL FIELD

The present invention relates to an advertisement distribution technique, and particularly relates to a technique allowing advertisements to be equally inserted (displayed or exposed) on a communication site screen that is read by a user through a network and also allowing advertisements to be distributed in accordance with characteristics of the user.

BACKGROUND ART

In recent years, as a network such as the internet has become widespread and the number of users thereof has increased, advertisements have been vigorously inserted on communication site screens and the like that are read through the network, and a large number of proposals regarding an advertisement distribution system have been made (e.g. Patent References 1 to 5).

Further, there has been proposed a mechanism in which an advertisement associated with a search keyword is displayed in a specific section on a Web page in a search engine and the like of the internet. In this mechanism, on the precondition that the user who conducts search has a keen interest in a keyword that he or she has inputted, advertisement information associated with the keyword is provided. Moreover, in this mechanism, an advertisement distributing side initially determines a bid price for each keyword, and an advertisement displaying order is determined in accordance with the heights of the bid prices.

[Patent Reference 1]: Japanese Patent Laid-Open No. 2001-236444
[Patent Reference 2]: Japanese Patent Laid-Open No. 2002-7462
[Patent Reference 3]: Japanese Patent Laid-Open No. 2002-56280
[Patent Reference 4]: Japanese Patent Laid-Open No. 2002-366834
[Patent Reference 5]: Japanese Patent Laid-Open No. 2003-16334

DISCLOSURE OF THE INVENTION

Problems the Invention Attempts to Solve

Nevertheless, in the conventional advertisement distribution system, an attribute of the user has been specified with respect to each kind of Web site in which the user is interested, and only advertisements specific to that attribute have been provided. For example, on a newspaper site for economy information, only advertisements regarding stocks or advertisements regarding bank loans are provided in which the user does not necessarily have a keen interest, and there has thus been a problem of causing decreases in impression of and interest in advertisements.

Further, in the case of advertisements attached to a search engine, there has been a problem in that selection ratios are high for advertisement bidded high by an advertisement requesting person and an advertisement belonging to a keyword with respect to which the number of advertisements requested to be inserted is large, whereas selection ratios are low for an advertisement bidded low, an advertisement belonging to a keyword with respect to which the number of advertisements requested to be inserted is small, and some other advertisements. Therefore, only advertisements associated with a certain keyword are successively selected, and the user are thus shown advertisements associated with a specific keyword more than necessary, thereby causing decreases in impression of and interest in advertisements, and occurrence of a feeling of repulsion thereto.

Moreover, in the conventional advertisement distribution in a search engine, an advertisement that attracts interest of the user is not provided to advertisements associated with a keyword, whereby it has not been possible to obtain a sufficient advertising effect.

Furthermore, any of the advertisement distribution systems described in the foregoing references merely compares an attribute of the user who will read an advertisement through the network with attribute conditions, such as an age, a hobby and a residential area, of an object user which are desired by the advertisement distributor who requests advertisement distribution, and selects an advertisement when these attributes agree with each other, so as to efficiently distribute an advertisement The present invention was made in view of the conventional situations as described above, and has an object to provide a mechanism capable of acquiring all-round advertisement information in a field of interest of the user by equally selecting and distributing advertisements, so as to efficiently achieve promotion of sales activities.

Means for Solving the Problems

A first advertisement distribution system of the present invention is an advertisement distribution system to insert a specific advertisement on a communication site screen to be read by a user through a network, comprising: an advertisement distributor terminal that is used by an advertisement distributor who requests distribution of the advertisement; a user terminal that is used by the user who reads a communication site with the advertisement inserted thereon; and an advertisement distribution management device communicably connected with the advertisement distributor terminal and the user terminal through the network, wherein the advertisement distributor terminal has an advertisement distribution requesting device of accepting input of advertisement distribution request information at least including category information that shows sections where an advertisement the distribution of which is requested is categorized, along with this advertisement, to transmit the information and the advertisement to the advertisement distribution management device, the user terminal at least has: an distribution approved advertisement designating device of accepting input of user information at least including category information that shows sections, where an advertisement the distribution of which is approved by the user is categorized, to transmit the inputted information to the advertisement distribution management device; a communication site reading requiring device of accepting a requirement for reading a communication site which is accompanied by input of a identification information specifying the user, to transmit the requirement to the advertisement distribution management device; and a communication site displaying device of receiving an advertisement determined based upon the user information and information of the communication site the reading of which is required from the advertisement distribution management device, to display a site screen with this advertisement inserted thereon, and the advertisement distribution management device at least has: an advertisement distribution request accepting device of receiving the advertisement and the advertisement distribution request information from the advertisement distributor terminal; an advertisement distributor information storing device of mutually associating and storing the advertisement and the advertisement distribution request information which were received in the advertisement distribution request accepting device; a user information accepting device of receiving the user information from the user terminal; a user information storing device of storing the user information received in the user information accepting device, with user identification information added thereto; a communication site reading requirement accepting device of receiving the requirement for reading a communication site including the user identification information from the user terminal; a category extracting device of acquiring the user identification information from the reading requirement received in the communication site reading requirement accepting device, to extract category information based upon this identification information with reference to the user information storing device; a category determining device of determining one piece of category information out of the extracted category information; an advertisement determining device of determining an advertisement that belongs to the category information determined in the category determining device with reference to the advertisement distributor information storing device after determination of the category information; and an advertisement distributing device of transmitting the determined advertisement to the user terminal along with the information of the communication site the reading of which is required.

A second advertisement distribution of the present invention system is an advertisement distribution system to insert a specific advertisement on a communication site screen to be read by a user through a network, comprising: an advertisement distributor terminal that is used by an advertisement distributor who requests distribution of the advertisement; a site manager terminal that is used by a site manager who provides a communication site to be read by the user; a user terminal that is used by the user who reads a communication site with the advertisement inserted thereon; and an advertisement distribution management device communicably connected with the advertisement distributor terminal, the site manager terminal and the user terminal through the network, wherein the advertisement distributor terminal has an advertisement distribution requesting device of accepting input of advertisement distribution request information at least including category information that shows sections where an advertisement the distribution of which is requested is categorized, along with this advertisement, to transmit the information and the advertisement to the advertisement distribution management device, the site manager terminal has an advertisement insertion licensed site designating device of accepting input of advertisement insertion license information at least including category information that shows sections where an advertisement the insertion of which is licensed by the site manager is categorized and inserting location information that designates an advertisement inserting location, to transmit the inputted information to the advertisement distribution management device, the user terminal at least has: a communication site reading requiring device of accepting a requirement for reading a communication site, to transmit the requirement to the advertisement distribution management device; and a communication site displaying device of receiving an advertisement determined based upon the advertisement insertion license information and information of the communication site the reading of which is required from the advertisement distribution management device, to display a site screen with this advertisement inserted thereon, and the advertisement distribution management device at least has: an advertisement distribution request accepting device of receiving the advertisement and the advertisement distribution request information from the advertisement distributor terminal; an advertisement distributor information storing device of mutually associating and storing the advertisement and the advertisement distribution request information which were received in the advertisement distribution request accepting device; a site manager information accepting device of receiving the advertisement insertion license information from the site manager terminal; a site manager information storing device of storing the advertisement insertion license information received in the site manager information accepting device; a communication site reading requirement accepting device of receiving the requirement for reading a communication site from the user terminal; a category extracting device of extracting category information based upon inserting location information with reference to the site manager information storing device with the communication site, which was received in the communication site reading requirement accepting device and the reading of which is required, taken as the advertisement inserting location; a category determining device of determining one piece of category information out of the extracted category information; an advertisement determining device of determining one advertisement out of advertisements that belong to the category information determined in the category determining device with reference to the advertisement distributor information storing device after determination of the category information; and an advertisement distributing device of transmitting the determined advertisement to the user terminal along with the information of the communication site the reading of which is required.

A first advertisement distribution management device of the present invention is an advertisement distribution management device, which is connected through a communication network with an advertisement distributor terminal that is used by an advertisement distributor who requests distribution of an advertisement and a user terminal that is used by a user who reads a communication site with the advertisement inserted thereon, and inserts a specific advertisement on a communication site screen to be read by the user through the network, the device at least having: an advertisement distribution request accepting device of receiving from the advertisement distributor terminal an advertisement the distribution of which is requested and advertisement distribution request information at least including category information that shows sections where this advertisement is categorized; an advertisement distributor information storing device of mutually associating and storing the advertisement and the advertisement distribution request information which were received in the advertisement distribution request accepting device; a user information accepting device of receiving from the user terminal user information at least including category information that shows sections where an advertisement the distribution of which is approved is categorized; a user information storing device of storing the user information received in the user information accepting device, with user identification information added thereto; a communication site reading requirement accepting device of receiving a requirement for reading a communication site including the user identification information from the user terminal; a category extracting device of acquiring the user identification information from the reading requirement received in the communication site reading requirement accepting device, to extract category information based upon this identification information with reference to the user information storing device; a category determining device of determining category information out of the extracted category information; an advertisement determining device of determining an advertisement to be distributed out of advertisements that belong to the category information determined in the category determining device with reference to the advertisement distributor information storing device after determination of the category information; and an advertisement distributing device of transmitting the determined advertisement to the user terminal along with the information of the communication site the reading of which is required.

In that case, the first advertisement distribution management device of the present invention may be a device, wherein the advertisement distribution request accepting device further receives distributing location attribute information that designates advertisement distributing location conditions as advertisement distribution request information, the advertisement distributor information storing device mutually associates and stores the distributing location attribute information and the advertisement which were received in the advertisement distribution request accepting device, the user information accepting device further receives user attribute information as user information, the user information storing device mutually associates and stores the user attribute information and the category information which were received in the user information accepting device, the category extracting device further extracts the user attribute information along with the category information with reference to the user information storing device, and the advertisement determining device determines one advertisement having a distribution attribute complying with the user attribute information out of advertisements that belong to the determined category information with reference to the advertisement distributor information storing device.

A second advertisement distribution management device of the present invention is an advertisement distribution management device, which is connected through a communication network with an advertisement distributor terminal that is used by an advertisement distributor who requests distribution of an advertisement, a site manager terminal that is used by a site manager who provides a communication site to be read by the user, and a user terminal that is used by a user who reads a communication site with the advertisement inserted thereon, and inserts a specific advertisement on a communication site screen to be read by the user through the network, the device at least having: an advertisement distribution request accepting device of receiving from the advertisement distributor terminal an advertisement the distribution of which is requested and advertisement distribution request information at least including category information that shows sections where this advertisement is categorized; an advertisement distributor information storing device of mutually associating and storing the advertisement and the advertisement distribution request information which were received in the advertisement distribution request accepting device; a site manager information accepting device of receiving from the site manager terminal advertisement insertion license information at least including category information that shows sections where an advertisement the insertion of which is licensed by the site manager is categorized and inserting location information that designates an advertisement inserting location; a site manager information storing device of storing the advertisement insertion license information received in the site manager information accepting device; a communication site reading requirement accepting device of receiving a requirement for reading a communication site from the user terminal; a category extracting device of extracting category information based upon inserting location information with reference to the site manager information storing device with the communication site, which was received in the communication site reading requirement accepting device and the reading of which is required, taken as the advertisement inserting location; a category determining device of determining one piece of category information out of the extracted category information; an advertisement determining device of determining one advertisement out of advertisements that belong to the category information determined in the category determining device with reference to the advertisement distributor information storing device after determination of the category information; and an advertisement distributing device of transmitting the determined advertisement to the user terminal along with the information of the communication site the reading of which is required.

In that case, the second advertisement distribution management device of the present invention may be a device, wherein the advertisement distribution request accepting device further receives distributing location attribute information that designates advertisement distributing location conditions as advertisement distribution request information, the advertisement distributor information storing device mutually associates and stores the distributing location attribute information and the advertisement which were received in the advertisement distribution request accepting device, the site manager information accepting device further receives user attribute information as the advertisement insertion license information, the site manager information storing device mutually associates and stores the user attribute information, the category information and the inserting location information which were received in the site manager information accepting device, the category extracting device further extracts the user attribute information along with the category information with reference to the site manager information storing device, and the advertisement determining device determines one advertisement having a distribution attribute complying with the user attribute information out of advertisements that belong to the determined category information.

Further, the first and second advertisement distribution management devices of the present invention may be a device, wherein the advertisement distributor information storing device hierarchically stores the category information received in the advertisement distribution request accepting device, and the category determining device repeats determination of category information in accordance with the number of levels of the category information.

Further, the first and second advertisement distribution management devices of the present invention may be a device further having: a site information storing device of previously mutually associating and storing communication site information and information of the number of insertion frames for advertisements to be inserted on the communication site screen; and an advertisement inserted number specifying device of specifying the number of insertion frames for advertisements based upon the site information with reference to the site information storing device, wherein the advertisement determining device repeats determination of an advertisement out of advertisement information that belongs to the category information determined in the category determining device, in accordance with the number of advertisement insertion frames specified in the advertisement inserted number specifying device.

The first and second advertisement distribution management devices of the present invention may be a device further having: a site information storing device of previously mutually associating and storing communication site information and information of the number of insertion frames for advertisements to be inserted on the communication site screen; and an advertisement inserted number specifying device of acquiring site information in response to reception of a requirement for reading a communication site in the communication site reading requirement accepting device, to specify the number of advertisement insertion frames based upon the site information with reference to the site information storing device, wherein the category determining device repeats determination of category information in accordance with the number of advertisement insertion frames specified in the advertisement inserted number specifying device, and the advertisement determining device repeats determination of an advertisement in accordance with determination of category information in the category determining device.

The first and second advertisement distribution management devices of the present invention may be one further having: an exposure ratio variation information accepting device of receiving from the advertisement distributor terminal exposure ratio variation information which increases an exposure ratio determined in the advertisement determining device; and an exposure ratio variation information storing device of associating the exposure ratio variation information received in the exposure ratio variation information accepting device with each of the advertisement distributors having requested advertisement distribution, to store the received information, wherein the advertisement determining device specifies exposure ratio variation information with reference to the exposure ratio variation information storing device prior to determination of an advertisement, to determine an advertisement based upon this exposure ratio variation information.

A first advertisement distribution method of the present invention is an advertisement distribution method, where an advertisement distribution management device is provided which is connected through a communication network to an advertisement distributor terminal that is used by an advertisement distributor who requests distribution of an advertisement and a user terminal that is used by the user who reads a communication site with an advertisement inserted thereon, and a specific advertisement is inserted on a communication site screen to be read by a user through the network, the method at least having: a step where the advertisement distributor terminal accepts in an advertisement distribution requesting device input of advertisement distribution request information at least including category information that shows sections where an advertisement the distribution of which is requested is categorized, along with this advertisement, to transmit the information and the advertisement to the advertisement distribution management device, a step where the advertisement distribution management device receives in an advertisement distribution request accepting device the advertisement and the advertisement distribution request information which were transmitted from the advertisement distributor terminal; a step where the advertisement distribution management device mutually associates and stores in an advertisement distributor information storing device the advertisement and the advertisement distribution request information which were received in the advertisement distribution request accepting device; a step where the user terminal accepts in an distribution approved advertisement designating device input of user information at least including category information that shows sections where an advertisement the distribution of which is approved is categorized, to transmit the inputted information to the advertisement distribution management device; a step where the advertisement distribution management device receives in a user information accepting device the user information transmitted from the user terminal; a step where the advertisement distribution management device stores in a user information storing device the user information received in the user information accepting device, with user identification information added thereto; a step where the user terminal accepts in a communication site reading requiring device a requirement for reading a communication site which is accompanied by input of identification information specifying the user, to transmit the requirement to the advertisement distribution management device; a step where the advertisement distribution management device receives in a communication site reading requirement accepting device the requirement for reading a communication site including the user identification information that was transmitted from the user terminal; a step where the advertisement distribution management device acquires in a category extracting device the user identification information from the reading requirement received in the communication site reading requirement accepting device, and further, the category extracting device extracts category information based upon this identification information with reference to the user information storing device; a step where the advertisement distribution management device determines in a category determining device one piece of category information out of the category information extracted in the category extracting device; a step where the advertisement distribution management device determines in an advertisement determining device one advertisement out of advertisements that belong to the category information determined in the category determining device with reference to the advertisement distributor information storing device after determination of the category information; a step where the advertisement distribution management device transmits the advertisement determined in the advertisement determining device from an advertisement distributing device to the user terminal along with the information of the communication site the reading of which is required; and a step where the user terminal receives in a communication site displaying device the communication site information and the advertisement which were transmitted from the advertisement distribution management device, and further the communication site display device displays a site screen with this advertisement inserted thereon.

A second advertisement distribution method of the present invention is an advertisement distribution method, where an advertisement distribution management device is provided which is connected through a communication network to an advertisement distributor terminal that is used by an advertisement distributor who requests distribution of an advertisement, a site manager terminal that is used by a site manager who provides a communication site to be read by the user, and a user terminal that is used by the user who reads a communication site with an advertisement inserted thereon, and a specific advertisement is inserted on a communication site screen to be read by a user through the network, the method at least having: a step where the advertisement distributor terminal accepts in an advertisement distribution requesting device input of advertisement distribution request information at least including category information that shows sections where an advertisement the distribution of which is requested is categorized, along with this advertisement, to transmit the information and the advertisement to the advertisement distribution management device, a step where the advertisement distribution management device receives in an advertisement distribution request accepting device the advertisement and the advertisement distribution request information which were transmitted from the advertisement distributor terminal; a step where the advertisement distribution management device mutually associating and storing in an advertisement distributor information storing device the advertisement and the advertisement distribution request information which were received in the advertisement distribution request accepting device; a step where the site manager terminal accepts in an advertisement insertion licensed site designating device input of advertisement insertion license information at least including category information that shows sections where an advertisement the insertion of which is licensed by the site manager is categorized and inserting location information that designates an advertisement inserting location, to transmit the inputted information to the advertisement distribution management device; a step where the advertisement distribution management device receives in a site manager information accepting device the advertisement insertion license information transmitted from the site manager terminal; a step where the advertisement distribution management device stores in a site manager information storing device the advertisement insertion license information received in the site manager information accepting device; a step where the user terminal accepts in a communication site reading requiring device a requirement for reading a communication site, to transmit the requirement to the advertisement distribution management device; a step where the advertisement distribution management device receives in a communication site reading requirement accepting device the requirement for reading a communication site that was transmitted from the user terminal; a step where the advertisement distribution management device takes in a category extracting device the communication site, the reading of which is required and which was received in the communication site reading requirement accepting device, as an advertisement inserting location, and further, the category extracting device extracts category information based upon inserting location information with reference to the site manager information storing device; a step where the advertisement distribution management device determines in a category determining device one piece of category information out of the category information extracted in the category extracting device; a step where the advertisement distribution management device determines in an advertisement determining device one advertisement out of advertisements that belong to the category information determined in the category determining device with reference to the advertisement distributor information storing device after determination of the category information; a step where the advertisement distribution management device transmits the advertisement determined in the advertisement determining device from an advertisement distributing device to the user terminal along with the information of the communication site the reading of which is required; and a step where the user terminal receives in a communication site displaying device the communication site information and the advertisement which were transmitted from the advertisement distribution management device, and further, the communication site display device displays a site screen with this advertisement inserted thereon.

A first advertisement distribution program of the present invention is characterized by making a computer function as the following device in order to execute insertion of a specific advertisement on a communication site screen to be read by the user through a communication network, the computer being connected through the network to an advertisement distributor terminal that is used by an advertisement distributor who requests distribution of an advertisement and a user terminal that is used by the user who reads a communication site with an advertisement inserted thereon: a device of receiving from the advertisement distributor terminal an advertisement the distribution of which is requested and advertisement distribution request information at least including category information that shows sections where this advertisement is categorized; a device of mutually associating and storing the received advertisement and advertisement distribution request information in an advertisement distributor information storing device; a device of receiving from the user terminal user information at least including category information that shows sections where an advertisement the distribution of which is approved is categorized; a device of storing the received user information in a user information storing device, with user identification information added thereto; a device of receiving a requirement for reading a communication site including the user identification information from the user terminal; a device of acquiring the user identification information from the received reading requirement and further referencing the user information storing device, to extract category information based upon this identification information; a device of determining one piece of category information out of the extracted category information; a device of determining one advertisement out of advertisements that belong to the determined category information with reference to the advertisement distributor information storing device after determination of the category information; and a device of transmitting the determined advertisement to the user terminal along with the information of the communication site the reading of which is required.

A second advertisement distribution program of the present invention is characterized by making a computer function as the following device in order to execute insertion of a specific advertisement on a communication site screen to be read by the user through a communication network, the computer being connected through the network to an advertisement distributor terminal that is used by an advertisement distributor who requests distribution of an advertisement, a site manager terminal that is used by a site manager who provides a communication site to be read by the user and a user terminal that is used by the user who reads a communication site with an advertisement inserted thereon: a device of receiving from the advertisement distributor terminal an advertisement the distribution of which is requested and advertisement distribution request information at least including category information that shows sections where this advertisement is categorized; a device of mutually associating and storing the received advertisement and advertisement distribution request information in an advertisement distributor information storing device; a device of receiving from the site manager terminal advertisement insertion license information at least including category information that shows sections where an advertisement the insertion of which is licensed by the site manager is categorized and inserting location information that designates an advertisement inserting location; a device of storing the received advertisement insertion license information in a site manager information storing device; a device of receiving a requirement for reading a communication site from the user terminal; a device of taking the received communication site the reading of which is required as an advertisement inserting location, and further referencing the site manager information storing device, to extract category information based upon the inserting location information; a device of determining one piece of category information out of the extracted category information; a device of determining one advertisement out of advertisements that belong to the determined category information with reference to the advertisement distributor information storing device after determination of the category information; and a device of transmitting the determined advertisement to the user terminal along with the information of the communication site the reading of which is required.

According to the present invention, irrespective of the number of advertisement insertion requests included in categories the distribution of which are approved by the user, categories to which advertisements belong, the distribution of which are approved by the user, are equally selected, and further, advertisements included in the selected category are also equally selected and distributed on a communication site screen read by the user, thereby preventing loss of advertising opportunities, decreases in impression of and interest in advertisements, and occurrence of a feeling of repulsion thereto, so that promotion of sales activities can be efficiently achieved.

Further, irrespective of the number of advertisement insertion requests included in categories the insertion of which are licensed by the site manager, categories to which advertisements belong, the insertion of which are licensed by the site manager, are equally selected, and further, advertisements included in the selected category are also equally selected and distributed on a communication site screen read by the user, thereby allowing distribution of an advertisement belonging to a category desired by the user, so that promotion of sales activities by device of an advertisement can be efficiently achieved.

BRIEF DESCRIPTION OF THE DRAWINGS

FIG. 1 is a schematic view showing a first embodiment example of an advertisement distribution system according to the present invention;

FIG. 2 is a block constitutional diagram showing the first embodiment example of the advertisement distribution system according to the present invention;

FIG. 3 is a structural example of a database for advertisement distributor information, which is stored in a storing section provided in an advertisement distribution management device according to the present invention;

FIG. 4 is a structural example of a category database stored in the storing section in the advertisement distribution management device according to the present invention;

FIG. 5 is a structural example of a distribution regional division database stored in the storing section in the advertisement distribution management device according to the present invention;

FIG. 6 is a structural example of a user information database stored in the storing section in the advertisement distribution management device according to the present invention;

FIG. 7 is a structural example of a site information database stored in the storing section in the advertisement distribution management device according to the present invention;

FIG. 8 is a structural example of an exposure ratio variation information database stored in the storing section in the advertisement distribution management device according to the present invention;

FIG. 17 is a structural example of a site manager information database stored in the storing section provided in the advertisement distribution management device according to the present invention;

FIG. 18 is a sequence diagram showing a flow of processing in a second embodiment of the advertisement distribution method according to the present invention;

FIG. 19 is a flowchart showing an example of information processing according to the second embodiment of the advertisement distribution method according to the present invention; and FIG. 20 is a flowchart showing a sequel to the example of information processing shown in FIG. 16.

DESCRIPTION OF SYMBOLS

Figure 9:
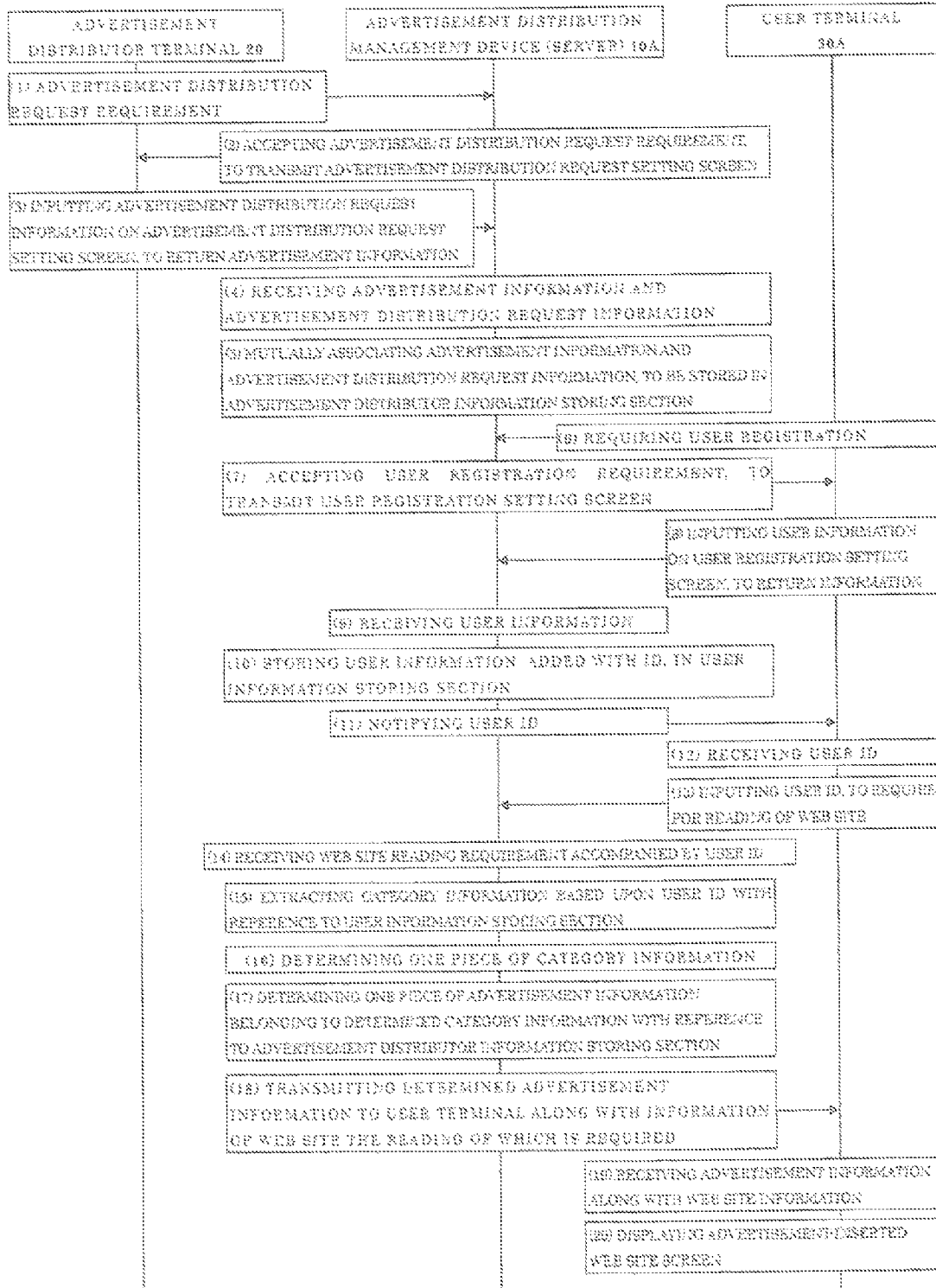
FIG. 9 is a sequence diagram showing a flow of processing in a first embodiment of an advertisement distribution method according to the present invention.

DB1 Advertisement distributor information
DB2A User information
DB2B Site manager information
DB3 Site information
DB4 Exposure ratio variation information
NW Communication network
P1 Advertisement distribution request setting screen
P2 User registration setting screen
P3 Web site screen
P31, P32, P33 Advertisement insertion frame
10A, 10B Advertisement distribution management device (server)
20 Advertisement distributor terminal
30A, 30B User terminal
40 Site manager terminal

BEST MODE FOR CARRYING OUT THE INVENTION

In the following, embodiments of an advertisement distribution system, device and method, and an advertisement distribution program according to the present invention are described with reference to drawings.

It is to be noted that embodiments below are described taking as an example a case where the user reads a Web site of a groupware on which a net advertisement is inserted (displayed or exposed) through the use of a communication network such as the internet. Namely, the communication site is a Web site, and a specific advertisement inserted on this communication site screen is a net advertisement (hereinafter simply referred to as "advertisement") belonging to a category the distribution of which is approved by the user. Therefore, an advertisement in the form of text data may be inserted on a web page, or advertisement information may be previously registered in a database and designated advertisement information may be acquired and displayed, or an advertisement is inserted (pasted) on a Web site screen such as a homepage in the form of so-called "banner advertisement".

First Embodiment

FIG. 1 is a schematic view showing a first embodiment example of an advertisement distribution system according to the present invention (hereinafter referred to as "present system"), and FIG. 2 is a block constitutional view of the same.

The present system is made up of an advertisement distributor terminal 20, a user terminal 30A, and an advertisement distribution management device (hereinafter referred to as "present server") 10A communicably connected with the terminals through a communication network NW.

Examples of the communication network NW may include the internet and computer communication networks such as LAN (Local Area Network). The present server 10A, the advertisement distributor terminal 20 and the user terminal 30A are connectable to the communication network NW through communication lines such as leased lines, public switched telephone networks (PSTN), wireless telephone networks, CATV networks or satellite communication networks.

The advertisement distributor terminal 20 is a terminal that is used by an advertisement distributor who requests advertisement distribution. The advertisement distributor terminal 20 may be an information processing device capable of transmitting and receiving information to and from the present server 10A, and is realized for example by a personal computer, a PDA (Personal Digital Assistant) having a data communication function, a cell phone, and the like.

The advertisement distributor terminal 20 at least has an advertisement distribution requesting section 21 as shown in FIG. 2.

The advertisement distribution requesting section 21 is a means of performing a process to accept input of advertisement distribution request information at least including category information (hereinafter simply referred to as "categories") that shows sections where an advertisement the distribution of which is requested is categorized, along with this advertisement, and transmit the information and the advertisement to the present server 10A. This advertisement distribution request information may be made to include an attribute of a distributing location which designates an advertisement distributing location condition: what sort of user the advertisement distributor as an advertisement provider wishes to distribute an advertisement to. Further, items of the distributing location attribute may include the user's sex, birth date, residential area (address), place of business, occupation, annual income, the presence or absence of a spouse, and the user's family structure.

This advertisement distribution request information may be made to include a requirement condition regarding selection of a Web site, such as on what kind of communication site (content) the advertisement distributor as the advertisement provider wishes to insert an advertisement.

The user terminal 30A is a terminal used by a user as a subscriber of a groupware who reads a Web site with an advertisement inserted thereon. The user terminal 30A may also be an information processing device capable of transmitting and receiving information to and from the present server 10A, and is realized for example by a personal computer, a PDA (Personal Digital Assistant) having a data communication function, a cell phone, and the like.

As shown in FIG. 2, this user terminal 30A has a distribution-approved advertisement designating section 31, a communication site reading requirement section 32, and a communication site display section 33.

The distribution-approved advertisement designating section 31 is a means of performing a process to accept input of user information at least including categories showing sections where an advertisement the distribution of which is approved is categorized (i.e. what kind of category an advertisement the user him/herself wishes to see belongs to), to transmit the inputted information to the present server 10A.

The category is a field selected by the user as a field of his or her interest, and corresponds to a category that categorizes advertisements. Examples of the category may include a professional baseball and soccer as for sports, and go and Japanese chess as for hobbies.

Further, the user information may be made to include an attribute that represents a characteristic of the user him/herself. Items of this attribute may include the user's sex, birth date, residential area (address), place of business, occupation, annual income, the presence or absence of a spouse, and the user's family structure.

This user information is inputted and transmitted to the present server 10A so that identification information unique to the user (hereinafter referred to as "user ID") is granted. From that time on, when making a requirement for reading a Web site, the user needs to input the user ID so as to be identified with this user ID.

The communication site reading requirement section 32 is a means of performing a process to accept a requirement for reading a Web site accompanied by input of the user ID, and transmit the requirement to the present server 10A.

The communication site display section 33 is a means of performing a process to receive an advertisement determined based upon user information and information of a Web site the reading of which is required from the present server 10A, and display a Web site screen with this advertisement inserted thereon.

Next, a configuration of the present server 10A is described.

As shown in FIG. 2 as an example, the present server 10A at least has an advertisement distributor information DB1, user information DB2A, an advertisement distribution request accepting section 11, a user information accepting section 12A, a communication site reading requirement accepting section 13, a category extracting section 14, a category determining section 15, an advertisement determining section 16, and an advertisement distributing section 17.

Further, although not shown, the present server 10A has a CPU (Central Processing Unit) and a program storing section. The CPU controls the constitutional elements of the present server 10A to execute program processing in accordance with a program stored in the program storing section. The program storing section is made up of memories such as a ROM (Read Only Memory) and a RAM (Random Access Memory) and an external storage device such as a hard disk drive, and stores a variety of programs to be used by the present server 10A.

It is to be noted that in the present server 10A, an advertisement distribution program according to the present invention (hereinafter referred to as "present program") is activated to control the means within the present server 10A, to realize an advertisement distribution method (hereinafter referred to as "present method") that is described below.

Further, with the use of a computer-readable record medium in which the present program is recorded (hereinafter referred to as "present record medium"), it is possible to make a computer that is not shown function in the same manner as the present server 10A. Namely, the computer that is not shown reads the present program from the present record medium and executes the program so that the present method can be realized.

The advertisement distributor information DB1 is given by mutually associating the advertisement and the advertisement distribution request information which were received in the advertisement distribution request accepting section 11 to create a database.

This advertisement distributor information DB1 mutually associates and stores categories where the advertisement information are categorized and advertisement information in each of the categories. The category corresponds to a category selected by the user, and examples of the category may include a professional baseball and soccer as for sports, and go and Japanese chess as for hobbies.

The advertisement distributor information DB1 is also capable of hierarchically storing categories which were received in the advertisement distribution request accepting section 11.

FIG. 3 is a pattern diagram showing an example of information stored in the advertisement distributor information DB1. For example, a distributing location attribute that designates distributing location conditions, such as an advertisement ID, advertisement information, a category section 1, a category section 2, a sex, an age 1, an age 2 and a distribution area, are mutually associated and stored.

The category section 1 and the category section 2 show sections of categories that advertisements are categorized in (belong to), and when the category is hierarchically sectionalized, the category section 1 shows an upper section and the category section 2 shows a lower section. Therefore, FIG. 3 shows that the hierarchical number of categories is "2". It is to be noted that, when categories are not hierarchically sectionalized, only the category section 1 is formed. Further, the hierarchical number of categories is not limited to one or two, but may be three or more.

In the case of the category section 1, the categories are sectionalized for example based upon a master file for the category section 1 shown in FIG. 4(a). As shown in FIG. 4(a), an upper category AAA shows a section "A", an upper category BBB shows a section "B", an upper category CCC shows a section "C", an upper category DDD shows a section "D", and an upper category EEE shows a section "E".

Further, in the case of the category section 2, categories are sectionalized for example based upon a master file for the category section 2 shown in FIG. 4(b). As shown in FIG. 4(b), when the category section 1 is "A", the lower category being not restricted shows a section "100", the lower category "aaa" shows a section "101", the lower category "aab" shows a section "102" and the lower category "aac" shows a section "103", and when the category section 1 is "B", the low category being not restricted shows a section "200", the lower category "bba" shows a section "201", the lower category "bbb" shows a section, "202", and the lower category "bbc" shows a section "203", respectively.

Further, as setting of the attribute of the user to distribute an advertisement, "1" is set when the sex is a male, "2" is set when the sex is a female, and "0" is set when the sex is not restricted and either a male or a female. Moreover, an age 1 shows a lower limit age and an age 2 shows an upper limit age, and "00" shows the age being not restricted in both of the above cases.

Further, the distribution areas are sectionalized based upon a distribution area section master file shown in FIG. 5. As shown in FIG. 5, a case where the distribution area is not restricted is shown with a section "000", a case where the distribution area is the whole of an area "AA" is shown with a section "100", a case where when the distribution area is "aa" in the area "AA" is shown with the section "110", and a case where the distribute area is "ab" in the area "AA" is shown with a section "120" respectively. Moreover, a case where the distribution area is the whole of an area "BB" is shown with a section "200", a case where when the distribution area is "ba" in the area "BB" is shown with the section "210", and a case where the distribute area is "bb" in the area "BB" is shown with a section "220". Furthermore, a case where the distribution area is the whole of an area "CC" is shown with a section "300", a case where when the distribution area is "ca" in the area "CC" is shown with the section "310", and a case where the distribute area is "cb" in the area "CC is shown with a section "320".

Accordingly, in FIG. 3, advertisement information "CM001.html" of the advertisement ID "CM001" belongs to the upper category "AAA", and the lower category is not restricted. Further, it is shown as distribution request information that the distributing location conditions of this advertisement information "CM001.html" are the distribution area corresponding to "ca" in the area "CC", and either a male or a female at ages from 16 to 30. Meanwhile, advertisement information "CM002.html" of the advertisement ID "CM002" belongs to the upper category "BBB" and the lower category "bba". Further, it is shown as distribution request information that the distributing location conditions of this advertisement information "CM002.html" are the distribution area corresponding to the whole of the area "BB", and only a male and at an age not restricted.

The present server 10A can search the advertisement distributor information DB1 with the category section as an index (based upon the category section), so as to read an advertisement stored as associated with this category section. Further, the present server 10A can search the advertisement distributor information DB1 with the category section and the distributing location conditions as indexes, so as to read an advertisement stored as associated with this category section.

The user information DB2A is a storage means of adding the user ID to the user information received in the user information accepting section 12A, to store the information.

Further, the user information DB2A mutually associates and stores the user attribute information and categories included in the user information when the user attribute information is received in the user information accepting section 12A.

FIG. 6 is a pattern diagram showing an example of information stored in the user information DB2A, and for example, the user attributes such as a user ID, a category section 1, a category section 2, a sex, an age 1, an age 2 and a distribution area, are mutually associated and stored.

The category section 1 and the category section 2 show sections where advertisements the distribution of which are approved by the user are categorized and sectionalized to be shown in the same manner as the advertisement distributor information DB1. The sex is a sex of the user him/herself, and shown with "1" in the case of a male and "2" in the case of a female. The residential area is a residential area (or place of business) of the user him/herself, which is sectionalized and shown for example based upon a distribution area section database shown in FIG. 5.

Therefore, in FIG. 6, a user of a user ID "CU001" is a 25-year-old male, and his residential area (or place of business) corresponds to "ca" in the area "CC". It is shown that a section of an advertisement the distribution of which is approved by this user with the user ID "CU001" belongs to the upper category of "AAA" and the lower category of "aaa". Further, a user of a user ID "CU002" is an 18-year-old male, and his residential area (or place of business) corresponds to "ba" in the area "BB". It is shown that a section of an advertisement the distribution of which is approved by this user with the user ID "CU002" belongs to the upper category of "BBB" and the lower category of "bbb".

The present server 10A is capable of searching the user information DB2A, using the user ID as an index (based upon the user ID), to read a category section stored as associated with this user ID.

Each of the databases described above is realized on a storage device, such as a hard disk, which is mounted on or connected to the present server 10A.

The advertisement distribution request accepting section 11 is a means of performing a process to receive an advertisement distribution request requirement from the advertisement distributor terminal 20 and transmit advertisement distribution request setting screen information, and also receive the advertisement and the advertisement distribution request information which were inputted in accordance with the advertisement distribution request setting screen information, from the advertisement distributor terminal 20. The advertisement and the advertisement distribution request information which were received in the advertisement distribution request accepting section 11 are stored in the advertisement distributor information DB1.

Further, the advertisement distribution request accepting section 11 also performs a process of further receiving distributing location attribute information that designates an advertisement distributing location condition as advertisement distribution request information.

The user information accepting section 12A is a means of performing a process to receive a user registration request from the user terminal 30A and transmit user registration setting screen information, and to receive user information, inputted in accordance with this user registration setting screen information, from the user terminal 30A. The user information received in the user information accepting section 12A is stored in the user information DB2A.

Moreover, the user information accepting section 12A also performs a process of receiving user attribute information as user information.

The communication site reading requirement accepting section 13 is a means of performing a process to receive a requirement for reading a communication site including user identification information from the user terminal 30A.

The category extracting section 14 is a means of performing a process to acquire a user ID from the reading requirement received in the communication site reading requirement accepting section 13, and extract a category based upon this user ID with reference to the user information DB2A.

Further, when the communication site reading requirement accepting section 13 receives a reading requirement, the category extracting section 14 performs a process of extracting a user attribute along with a category based upon the user ID acquired from the reading requirement with reference to the user information DB2A.

The category determining section 15 is a means of performing a process to determine one category out of categories extracted in the category extracting section 14 when a plurality of categories are extracted.

Further, the category determining section 15 also performs a process of repeating determination of a category in accordance with the hierarchical number of categories when categories are hierarchically stored in the advertisement distributor information DB1.

One category determined in the category determining section 15 is then transmitted to the advertisement determining section 16.

The advertisement determining section 16 performs a process to extract advertisement information that belongs to a category agreeing with the category determined in the category determining section 15 with reference to the advertisement distributor information DB1 after determination of the category. Further, when there are a plurality of pieces of advertisement information, the advertisement determining section 16 performs a process of determining one advertisement out of the advertisement information.

Further, when accepting a user attribute from the category extracting section 14, the advertisement determining section 16 also performs a process of determining one advertisement having a distribution attribute complying with the user attribute out of advertisements that belong to the category determined in the category determining section 15 with reference to the advertisement distributor information DB1 after determination of the category.

The advertisement distributing section 17 performs a process of transmitting the advertisement determined in the advertisement determining section 16 to the user terminal 30A along with information of a Web site the reading of which is required.

It is thereby possible to provide the user (user terminal 30A) with information (content) of a Web site with an advertisement inserted thereon.

It is to be noted that the Web site information transmitted from the present server 10A to the user terminal 30A is, for example, a web page readable as a home page on the user terminal 30A side by activating a WWW browser, and information is exchanged between the present server 10A and the user terminal 30A by the use of the HTTP protocol. Namely, when receiving a requirement for reading a Web site from the user terminal 30A, the present server 10A can specify the user terminal 30A, so as to transmit the read advertisement and Web site information to the specified user terminal 30A. The information having specified the user terminal 30A is temporarily stored in the user information DB2A. However, the information exchange between the present server 10A and the user terminal 30A is not limited to this.

Further, the present server 10A may further have a site information DB3 and an advertisement insertion number specifying section 18.

The site information DB3 is a means of previously mutually associating and storing Web site information and information of the number of insertion frames for advertisements to be inserted on the Web site screen.

The Web site information refers to, for example, a URL for linking to a Web site the reading of which is required by the user.

Moreover, the number of advertisement insertion frames refers to, for example, the number of advertisements that can be inserted (displayed or exposed) on a Web site the reading of which is required by the user.

FIG. 7 is a pattern diagram showing an example of information stored in the site information DB3, and for example, a site ID, a URL as Web site information and the number of advertisement insertion frames are mutually associated and stored.

Therefore, in FIG. 7, as for a Web site with a site ID "HP001", the URL is "http://www.abc.co.jp/", and the number of advertisement insertion frames is "3". Further, as for a Web site with a site ID "HP002", the URL is "http://www.aaa.co.jp/" and the number of advertisement insertion frames is "1", respectively.

The advertisement insertion number specifying section 18 is a means of performing a process to specify the number of advertisement insertion frames with reference to the site information DB3 in response to reception of a requirement for reading a Web site in the communication site reading requirement accepting section 13.

In this case, the advertisement determining section 16 performs a process of repeating determination of one advertisement out of advertisements that belong to categories determined in the category determining section 15 in accordance with the number of advertisement insertion frames specified in the advertisement insertion number specifying section 18.

Further, in this case, the category determining section 15 performs a process of repeating determination of category information in accordance with the number of insertion frames for advertisements specified in the advertisement insertion number specifying section 18, and the advertisement determining section 16 performs a process of repeating determination of an advertisement in accordance with determination of the category information in the category determining section 15.

Moreover, an example is described where the present server 10A further has an exposure ratio variation information DB4 and an exposure ratio variation information accepting section 19.

The exposure ratio variation information DB4 is a means of associating the exposure ratio variation information received in the exposure ratio variation information accepting section 19 with each advertisement distributor having requested advertisement distribution, to store the information.

FIG. 8 is a pattern diagram showing an example of information stored in the exposure ratio variation information storing section, and for example, an advertisement distributor ID, an advertisement ID and exposure ratio variation information are mutually associated and stored.

Therefore, FIG. 8 shows that the exposure ratio variation information is "2" as for an advertisement with an advertisement ID "CM001", the distribution of which is requested by an advertisement distributor with an advertisement distributor ID "CL001", and that the exposure ratio variation information is "1" as for an advertisement with an advertisement ID "CM002", the distribution of which is requested by an advertisement distributor with an advertisement distributor ID "CL002".

The exposure ratio variation information accepting section 19 performs a process of receiving from the advertisement distributor terminal 20 exposure ratio variation information that increases an exposure ratio determined in the advertisement determining section 16.

In this case, the advertisement determining section 16 specifies the exposure ratio variation information with reference to the exposure ratio variation information DB4 prior to advertisement determination, to determine an advertisement based upon this exposure ratio variation information.

The exposure ratio variation information shows an exposure ratio determined in the advertisement determining section 16. For example, when there are ten advertisements in an object category and the exposure ratio variation information of any one of the advertisements is "1", the probability of being determined in the advertisement determining section 16 is equally one tenth. However, when the exposure ratio variation information of one advertisement is "2", a total number of pieces of exposure ratio variation information within the category is eleven, and the probability of being determined in the advertisement determining section 16 is one eleventh for the advertisements with the exposure ratio variation information being "1", whereas the probability is two elevenths for the advertisement with the exposure ratio variation information being "2", and hence the probability of being determined in the advertisement determining section 16 is high as compared with the probability for other advertisements with the exposure ratio variation information being "1".

It is to be noted that this exposure ratio variation information is determined in accordance with the number of points purchased by the advertisement distributor. For example, "1" is added to the exposure ratio variation information by purchase of one point.

Next, the present method is described with reference to FIG. 9.

FIG. 9 is a sequence diagram showing an example of a first embodiment.

In the first embodiment, an advertisement that belongs to a category approved by the user is inserted on a Web site.

First, prescribed information such as category section information and distribution area section information is previously stored in the storing section within the present server 10A.

Subsequently, the advertisement distributor requires an advertisement distribution request from the advertisement distributor terminal 20 to the present server 10A (see (1)).

The present server 10A receives the advertisement distribution request requirement from the advertisement distributor terminal 20, and transmits an advertisement distribution request setting screen to the advertisement distributor terminal 20 in response to the received requirement (see (2)).

Next, the advertisement distributor terminal 20 receives the advertisement distribution request setting screen transmitted from the present server 10A, to output this screen.

Figure 10:
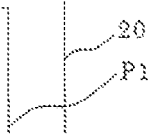
FIG. 10 is a pattern diagram showing an example of an advertisement distribution request setting screen displayed on a display of an advertisement distributor terminal connected with the advertisement distribution management device according to the present invention.

This advertisement distribution request setting screen can be represented for example in the form shown in FIG. 10. FIG. 10 is a view showing an example of the advertisement distribution request setting screen according to an embodiment of the present invention. This advertisement distribution request setting screen P1 is provided with columns where prescribed items are to be inputted, such as an advertisement distributor ID input column, a category 1 selection column for designating a category section where an advertisement the distribution of which is requested is categorized, a category 2 selection column for designating a lower category with respect to the category 1, an advertisement addition column for attaching an advertisement the distribution of which is requested, and a message input column. The attribute of the distributing location which designates conditions such as a sex, age and area of the advertisement distribution location may be inputted as a prescribed item. This can lead to efficient advertising due to equal distribution of advertisements as objects narrowed down.

The advertisement distributor then inputs prescribed items to be advertisement distribution request information on the advertisement distribution request setting screen in the advertisement distributor terminal 20 and selects a request button, to return an advertisement the distribution of which is requested to the present server 10A along with advertisement distribution request information (see (3)). It is to be noted that a cancel button is selected when the advertisement distribution request is cancelled.

The present server 10A receives the advertisement and the advertisement distribution request information from the advertisement distributor terminal 20 (see (4)).

Subsequently, the present server 10A mutually associates the received advertisement and advertisement distribution request information and stores them in the advertisement distributor information DB1 (see (5)). At this time, categories included in the received advertisement distribution request information may be hierarchically categorized and stored. This enables selection of a category in response to a variety of requirements from the user, such as selecting an advertisement by an ambiguous section or selection of an advertisement in a narrowing down section.

Meanwhile, the user makes a requirement for user registration from the user terminal 30A to the present server 10A (see (6)).

The present server 10A receives the user registration requirement from the user terminal 30A, and transmits user registration setting screen information to the user terminal 30A in response to the requirement (see (7)).

Next, the user terminal 30A receives the user registration setting screen information transmitted from the present server 10A, and outputs the screen.

Figure 11:
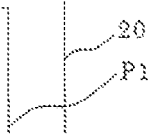
FIG. 11 is a pattern diagram showing an example of a user registration setting screen displayed on a display of a user terminal connected with the advertisement distribution management device according to the present invention.
Figure 12:
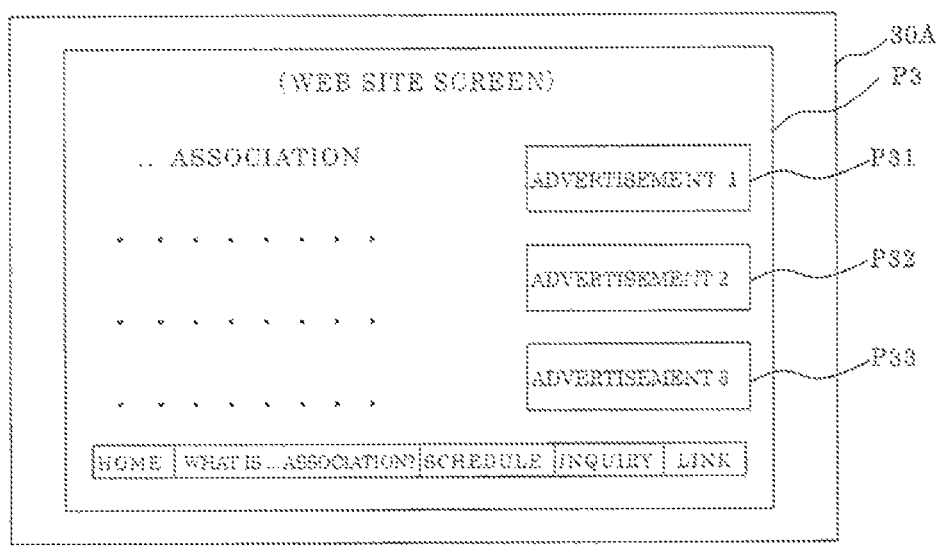
FIG. 12 is a pattern diagram showing an example of a Web site screen displayed on a display of the user terminal connected with the advertisement distribution management device according to the present invention.

This user registration setting screen can be represented for example in the form shown in FIG. 11. FIG. 11 is a view showing an example of the user registration setting screen according to the embodiment of the present invention. This user registration setting screen P2 is provided with columns where prescribed items are to be inputted, such as a name input column, an address input column, an age input column, a sex input column, a category 1 selection column for designating a category section in which an advertisement the distribution of which is approved is categorized, and a category 2 selection column for designating a lower category with respect to the category 1.

The user then inputs prescribed items to be user information on the user registration setting screen in the user terminal 30A and selects a register button, to return user information including a category in which the advertisement the distribution of which is approved is categorized to the present server 10A (see (8)). It is to be noted that a cancel button is selected when the user registration is canceled.

The present server 10A receives user information from the user terminal 30A (see (9)).

Subsequently, the present server 10A stores in the user information DB2A the received user information with the user ID added thereto (see (10)).

The present server 10A then transmits to the user terminal 30A the added user ID along with a guidance that a Web site will be read based upon this user ID from the next time on, to notify the user of the user ID (see (11)).

The user terminal 30A receives the user ID transmitted from the present server 10A (see (12)).

Next, the user makes a requirement for reading a Web site accompanied by input of the user ID, from the user terminal 30A to the present server 10A (see (13)).

The present server 10A receives the requirement from the user terminal 30A for reading a Web site, and confirms whether or not the user ID has been inputted (see (14)).

When confirming that the user ID has been inputted, the present server 10A extracts all categories where advertisements the distribution of which are approved by the user are categorized based upon this user. ID with reference to the user information DB2 (see (15)).

The present server 10A then determines one category out of the extracted categories (see (16)).

Further, the present server 10A determines one advertisement out of the advertisements that belong to the determined category with reference to the advertisement distributor information DB1 after determination of the category (see (17)).

At the time of making a requirement for reading a Web site, the number of insertion frames for advertisements insertable on the Web site is specified, and one category is determined in accordance with the number of advertisement insertion frames, to determine advertisements that belong to the category. It is thereby possible to change the number of distribution of advertisements in line with a design of an individual Web page, leading to efficient advertising.

Further, at the time of advertisement determination, exposure ratio variation information that increases an exposure ratio of an advertisement to be determined is set, to determine an advertisement based upon this exposure ratio variation information.

This eliminates the fear of unbalanced insertion of advertisements in the same category on a Web site screen to be read by the user, thereby to allow the probabilities of the advertisements being seen to equally increase.

Thereafter, the present server 10A transmits the determined advertisement to the user terminal 30A along with information of the Web site the reading of which is required (see (18)).

The user terminal 30A receives the Web site information and the advertisement which were transmitted from the present server 10A (see (19)).

The user terminal 30A then outputs and displays the received Web site information and advertisement as a Web site screen with this advertisement inserted thereon (see (20)).

This allows the user to read a Web site screen with a specific advertisement inserted thereon which belongs to the category the distribution of which is approved by the user him/herself.

Figure 13:
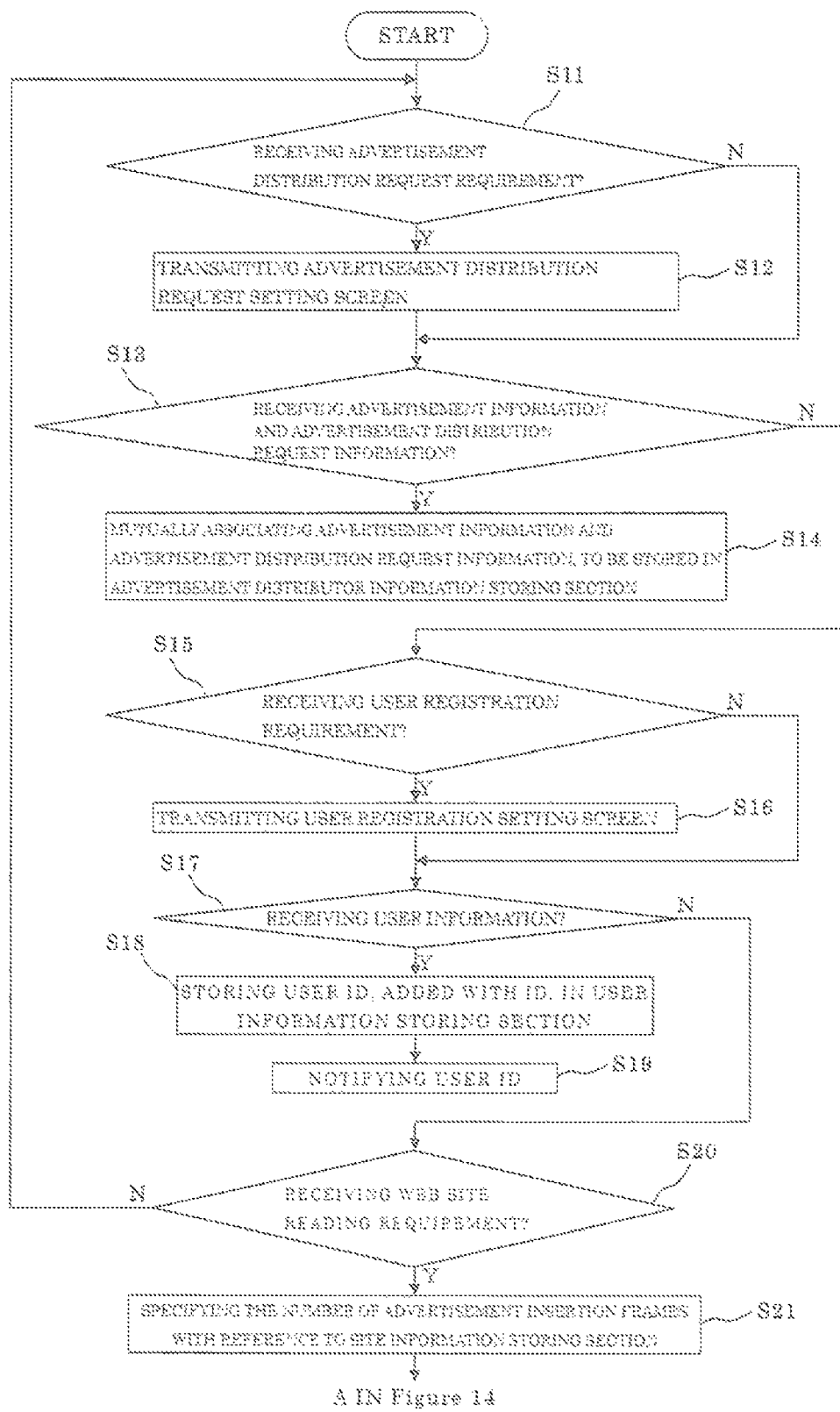
FIG. 13 is flowchart showing an example of information processing in accordance with the first embodiment of the advertisement distribution method according to the present invention.

Next, an example of detailed operations of the present server 10A having the configuration as thus described is described with reference to FIGS. 13 and 14. FIG. 13 is a flowchart showing a flow of processing in the present server 10A that executes the first embodiment, and FIG. 14 is a flowchart showing a sequence thereto.

Figure 14:
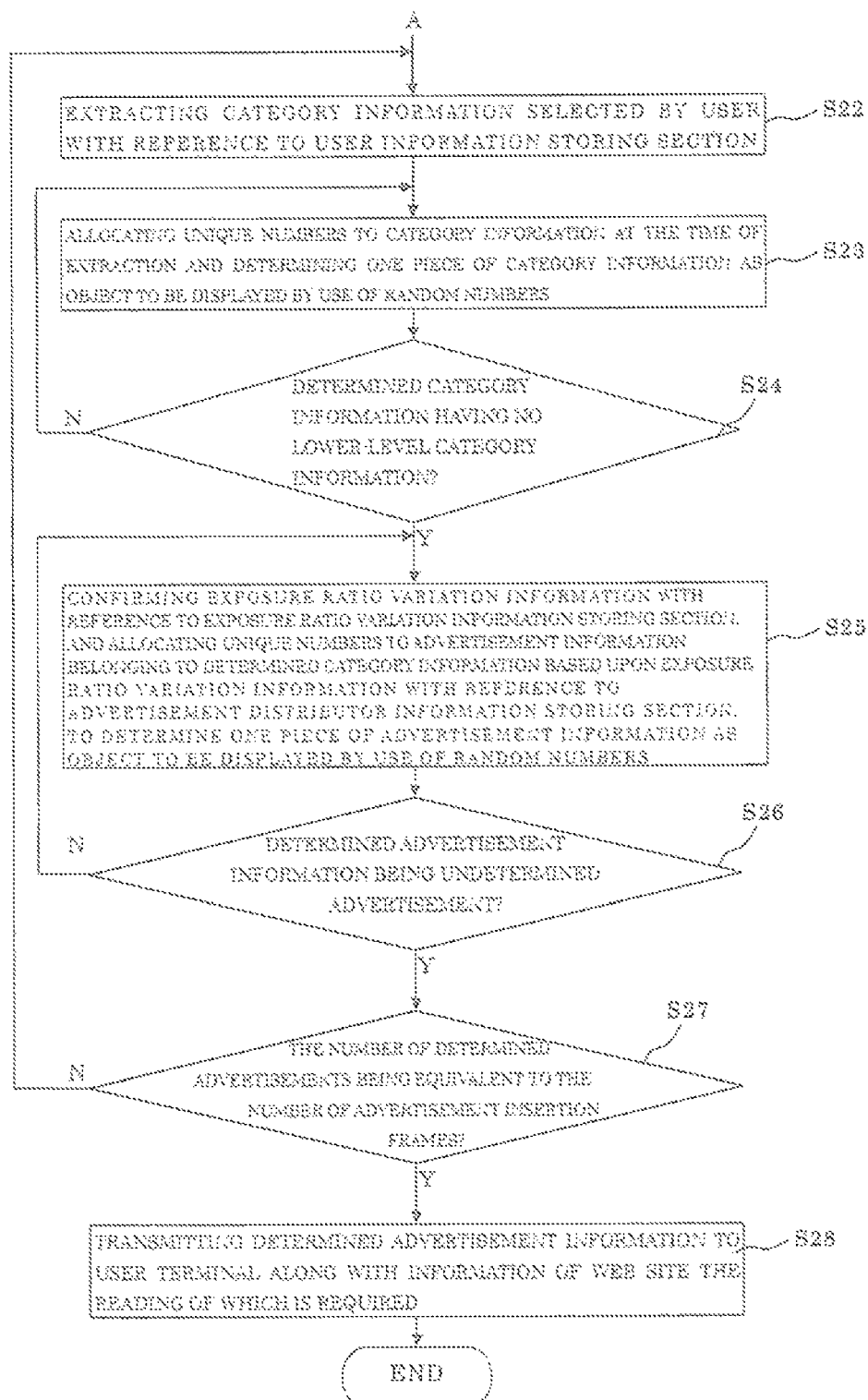
FIG. 14 is a flowchart showing a sequel to the example of information processing shown in FIG. 10.

As shown in FIGS. 13 and 14, first, the advertisement distribution request accepting section 11 determines whether or not an advertisement distribution request requirement has been received from the advertisement distributor terminal 20 (S11).

When the advertisement distribution request accepting section 11 has received the advertisement distribution request requirement (Y), the advertisement distribution request accepting section 11 transmits (returns) an advertisement distribution request setting screen to the advertisement distributor terminal 20 in response to reception of the advertisement distribution request requirement (S12).

On the other hand, when: the advertisement distribution request accepting section 11 has not received the advertisement distribution request requirement (N), or after the advertisement distribution request accepting section 11 has transmitted the advertisement distribution request setting screen, the advertisement distribution request accepting section 11 determines whether or not an advertisement the distribution of which is requested and advertisement distribution request information, at least including a category that shows sections where this advertisement is categorized from the advertisement distributor terminal 20 (S13).

As a result of that, when the advertisement distribution request accepting section 11 has received the advertisement and the advertisement distribution request information (Y), the advertisement distribution request accepting section 11 transmits the received advertisement and advertisement distribution request information to the advertisement distributor information DB1.

The advertisement distributor information. DB1 mutually associates and stores the advertisement and the advertisement distribution request information which were transmitted from the advertisement distribution request accepting section 11 (S14).

On the other hand, when the advertisement distribution request accepting section 11 has not received the advertisement and the advertisement distribution request information (N), the user information accepting section 12A next determines whether or not a user registration requirement has been received from the user terminal 30A (S15).

As a result of that, when the user information accepting section 12A has received the user registration requirement (Y), the user information accepting section 12A transmits (returns) user registration setting screen information to the user terminal 30A in response to reception of the user registration requirement (S16).

On the other hand, when the user information accepting section 12A has not received the user registration requirement (N), or after the user information accepting section 12A has transmitted the user registration setting screen information, the user information accepting section 12A determines whether or not user information at least including a category that shows sections where an advertisement the distribution of which is approved has been received from the user terminal 12A (S17).

As a result of that, when the user information accepting section 12A has received the user information (Y), the user information accepting section 12A transmits the received user information to the user information DB2A.

The user information DB2A stores the user information transmitted from the user information accepting section 12A with the user ID added thereto (S18).

The user information accepting section 12A then transmits (returns) the user ID added in the user information DB2 to the user terminal 30A (S19).

On the other hand, when the user information accepting section 12A has not received the user information (N), the communication site reading requirement accepting section 13 next determines whether or not a requirement for reading a Web site including a user ID that specifies the user has been received from the user terminal 30A (S20).

As a result of that, when the communication site reading requirement accepting section 13 has received the request for reading a Web site (Y), the communication site reading requirement accepting section 13 transmits the information to the advertisement insertion number specifying section 18 and the category extracting section 14.

The advertisement insertion number specifying section 18 then acquires a Web site information from the received reading requirement in accordance with information of reception of the reading requirement transmitted from the communication site reading requirement accepting section 13, specifies the number of advertisement insertion frames based upon this Web site information with reference to the site information DB3, and transmits this information of the number of insertion frames to the category determining section 15 (S21).

Further, the category extracting section 14 acquires a user ID from the received reading requirement in accordance with the information of reception of the reading requirement transmitted from the communication site reading requirement accepting section 13, and further extracts all categories which advertisements the distribution of which are approved (selected) by the user are belong to based upon this user ID with reference to the user information DB2A, to transmit all the extracted categories to the category determining section 15 (S22).

On the other hand, when the communication site reading requirement accepting section 13 has not received the request for reading a Web site (N), the advertisement distribution request accepting section 11 repeats determination as to whether or not the advertisement distribution request requirement has received from the advertisement distributor terminal 20 (S11).

The category determining section 15 allocates unique numbers to all categories accepted in the category extracting section 14, to determine one piece of category information as an object to be displayed by the use of random numbers (S23).

Next, the category determining section 15 determines whether or not there is a lower category at the level under the determined category with reference to the advertisement distributor information DB1 (S24).

As a result of that, when there is no lower category at the level under the determined category, the category determining section 15 transmits the determined category to the advertisement determining section 16 along with information the number of insertion frames accepted from the advertisement insertion number specifying section 18. The category determining section 15 then repeats determination of a category if necessary in accordance with information of the number of insertion frames.

On the other hand, when there is a lower category at the level under the determined category (N), the category determining section 15 allocates unique numbers to all categories included immediately under the determined categories, to determine one piece of category information out of all categories to be displayed by the use of random numbers (S23).

when accepting the category from the category determining section 15, the advertisement determining section 16 confirms exposure ratio variation information with reference to the exposure ratio variation information DB4, and extracts all corresponding advertisements based upon the accepted category with reference to the advertisement distributor information DB1, allocates unique numbers to all the extracted advertisements based upon the confirmed exposure ratio variation information, extracts one advertisement as an object to be displayed by the use of random numbers, to determine an advertisement to be displayed (S25). The determined advertisement is temporarily stored in the advertisement determining section 16.

This processing extracts advertisement information that belongs to each of categories determined by the category determining section 15, namely categories selected by the user (e.g. professional baseball, golf, go), provides numbers in order from one for sortition for extraction within each category, and generates a prescribed random number therefrom, to select a corresponding advertisement at random. In this case, the exposure ratio is made to increase in accordance with the exposure ratio variation information. Specifically, when there are advertisements A and B with exposure ratio variation information "1" and an advertisement C with exposure ratio variation information "2", numbers are provided in sequential order like "1. advertisement information A, 2. advertisement information B, 3. advertisement information C, 4. advertisement information C", and hence the exposure ratio is set so as to increase in accordance with the numbers of the exposure ratio variation information. Thereby, the probability of the advertisement information C being selected increases in accordance with the set exposure ratio variation information.

It is to be noted that in the case of selecting this advertisement information, previously displayed advertisement information may be excluded from objects to be selected.

Subsequently, after advertisement determination, the advertisement determining section 16 determines whether or not the determined advertisement is an undetermined advertisement, namely whether the determined advertisement is not a redundantly determined advertisement, with reference to already determined advertisements which are temporarily stored (S26).

As a result of that, when the determined advertisement is an undetermined advertisement, namely the advertisement has not been determined as an advertisement to be inserted on (transmitted to) the corresponding Web site (Y), the advertisement determining section 16 next determines whether or not the number of the determined advertisements is equivalent to the number of advertisement insertion frames based upon the information of the number of insertion frames accepted along with the category information (S27).

On the other hand, when the determined advertisement is an already determined advertisement (N), the advertisement determining section 16 again repeats determination of one advertisement (S25).

Further, as a result of determining whether or not the number of determined advertisements is equivalent to the number of advertisement insertion frames, when both numbers are equivalent (Y), all the determined advertisements are transmitted to the advertisement distributing section 17, and the advertisement distributing section 17 transmits the accepted (determined) advertisements to the user terminal along with information of a communication site the reading of which is required (S28).

On the other hand, when the number of the transmitted advertisements and the number of advertisement insertion frames are not equivalent (N), the category extracting section 14 extracts category information to which advertisements the distribution of which are approved by the user belong to based upon the user ID with reference to the user information DB2A, and repeats transmission of all the extracted category information to the category determining section 15 (S22).

Thereby, a series of basic operations in the present server 10A are ended.

As described above, the present server 10A is capable of selecting and determining a specific advertisement that belongs to a category the distribution of which is approved by the user out of a large number of advertisements that belong to a large number of categories, to provide the determined advertisement to the user. Namely, the present server 10A equally selects one category out of categories to which advertisements the distribution of which are approved by the user belong to, and further equally selects an advertisement included in the selected category, to distribute the selected advertisement to a Web site screen to be read by the user.

Therefore, unbalanced insertion of the same categories or the same advertisements on the Web site read by the user is prevented, to allow the advertisement distributor to equally distribute advertisements even when an advertisement belongs to a category with a small number of advertisements or when the user corresponds to an unexpected attribute, whereby possible to prevent loss of advertising opportunities, decreases in impression of and interest in advertisements, and occurrence of a feeling of repulsion thereto, so as to efficiently achieve promotion of sales activities.

Accordingly, although an advertisement bidded high by the advertisement provider has always been displayed in the conventional case, according to the foregoing embodiment, even in a case where advertisements are registered in categories registered by the user, e.g. ten, twenty and two advertisements are registered respectively in baseball related, golf related, and go related categories, the advertisements registered in each of the categories are equally displayed, thereby preventing unbalanced advertisement insertion as in the conventional case where only advertisements registered in large number (gold advertisements in the foregoing case) or advertisements with high set prices are inserted, so that advertisements can be efficiently provided.

Second Embodiment

Next, another embodiment of the present invention is described. It is to be noted that in the present embodiment, the same numerals are used for the same constitutional parts as in the first embodiment, and descriptions thereof are omitted.

The present embodiment is described by taking a case as an example where the user uses a communication network such as the internet, to read a Web site such as a company home page or an individual blog on which a net advertisement is inserted (displayed or exposed). Therefore, in the present embodiment, a specific advertisement inserted on a Web site screen is an advertisement that belongs to a category the insertion of which is licensed by the site manager.

Figure 15:
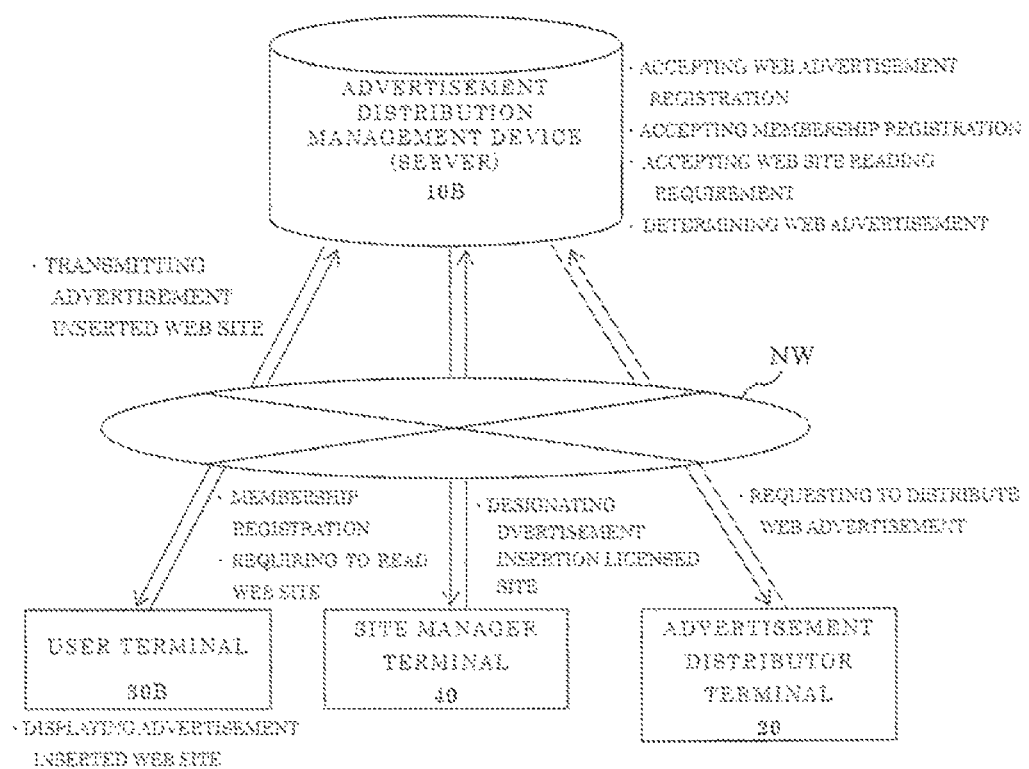
FIG. 15 is a schematic view showing a second embodiment example of the advertisement distribution system according to the present invention.
Figure 16:
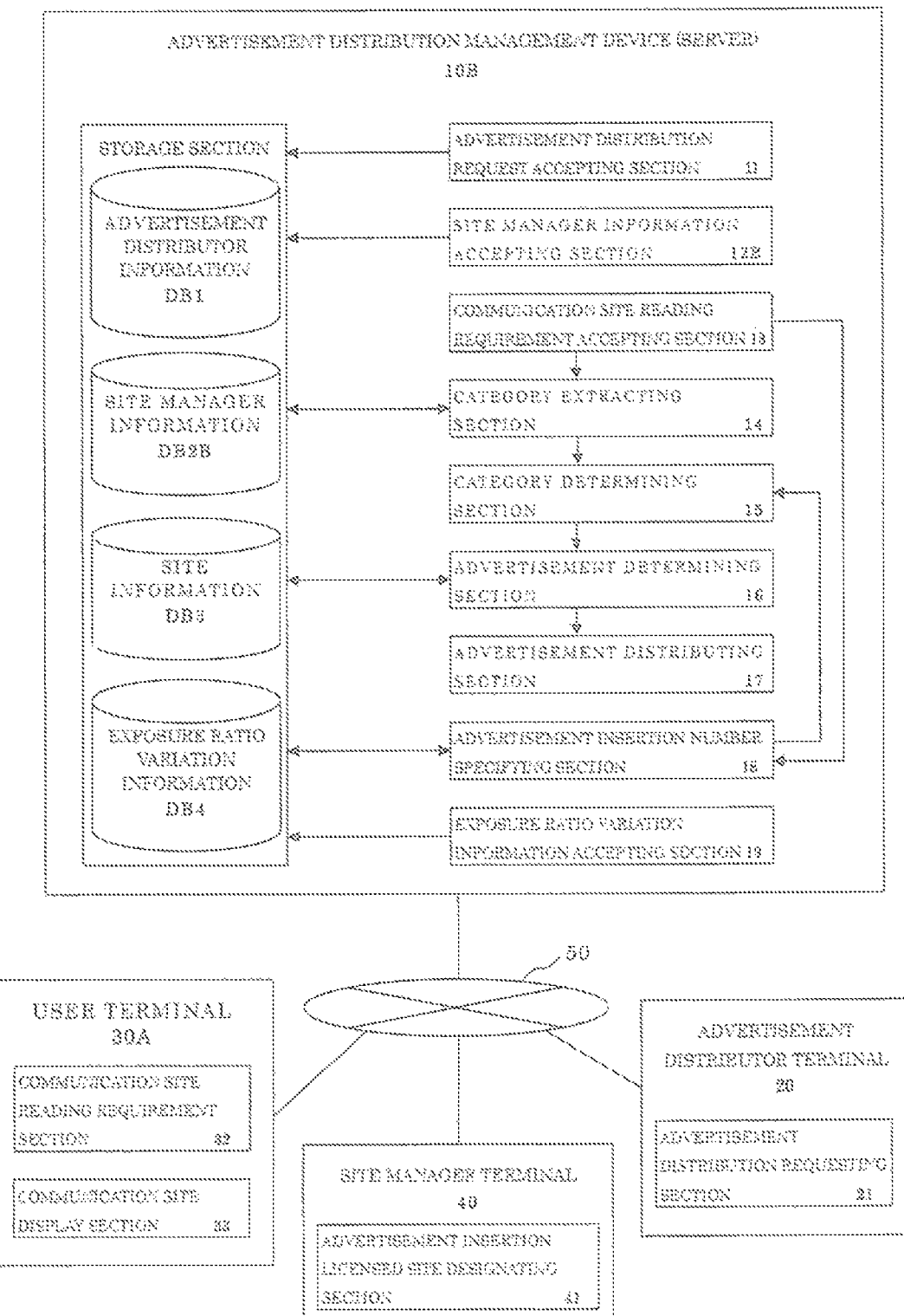
FIG. 16 is a block constitutional diagram showing the second embodiment example of the advertisement distribution system according to the present invention.

FIG. 15 is a schematic view showing a second embodiment example of the present system, and FIG. 16 is a block diagram of the same.

The present system is made up of the advertisement distributor terminal 20, a user terminal 30B, a site manager terminal 40, and the advertisement distribution management device (hereinafter referred to as "present server") 10B communicably connected with the terminals through the communication network NW.

Examples of the communication network NW may include the internet and a communication network such as LAN (Local Area Network). The present server 10B, the advertisement distributor terminal 20, the user terminal 30B, and the site manager terminal 40 are connected to the communication network NW through a communication line such as a leased line, public switched telephone networks (PSTN), wireless telephone networks, CATV networks or satellite communication networks.

The advertisement distributor terminal 20 is a terminal that is used by an advertisement distributor who requests advertisement distribution. The advertisement distributor terminal 20 may be an information processing device capable of transmitting and receiving information to and from the present server 10B, and is realized for example by a personal computer, a PDA (Personal Digital Assistant) having a data communication function, a cell phone, and the like.

This advertisement distributor terminal 20 at least has the advertisement distribution requesting section 21.

The user terminal 30B is a terminal used by the user who reads a Web site with advertisements inserted thereon. The user terminal 30B may also be an information processing device capable of transmitting and receiving information to and from the present server 10B, and is realized for example by a personal computer, a PDA (Personal Digital Assistant) having a data communication function, a cell phone, and the like.

This user terminal 30B has the communication site reading requirement section 32 and the communication site display section 33.

The communication site reading requirement section 32 is a means of performing a process to accept a requirement for reading a Web site and transmit the requirement to the present server 10B.

The communication site display section 33 is a means of performing a process to receive an advertisement determined based upon advertisement insertion license information and information of a Web site the reading of which is required from the present server 10B, and display a Web site screen with this advertisement inserted thereon.

The site manager terminal 40 is a terminal that is used by a site manager who provides a Web site to be read by the user. The site manager terminal 40 may also be an information processing device capable of transmitting and receiving information to and from the present server 10B, and is realized for example by a personal computer, a PDA (Personal Digital Assistant) having a data communication function, a cell phone, and the like.

This site manager terminal 40 at least has an advertisement insertion licensed site designating section 41.

The advertisement insertion licensed site designating section 41 is a means of performing a process to accept input of advertisement insertion license information at least including category information that shows sections where an advertisement the insertion of which is licensed by the site manager is categorized and inserting location information that designates an advertisement inserting location, and transmit the inputted information to the present server 10B.

This inserting location information is a URL of a Web site on which an advertisement the insertion of which is licensed by the site manager.

Next, a configuration of the present server 10B is described.

In the case of the present embodiment, as an example, the present server 10B at least has the advertisement distributor information DB1, a site manager information DB2B, the advertisement distribution request accepting section 11, a site manager information accepting section 12B, the communication site reading requirement accepting section 13, the category extracting section 14, the category determining section 15, the advertisement determining section 16, and the advertisement distributing section 17.

Further, although not shown, the present server 10B has a CPU (Central Processing Unit) and a program storing section. The CPU controls the constitutional elements of the present server 10B and executes program processing in accordance with a program stored in the program storing section. The program storing section is made up of memories such as a ROM (Read Only Memory) and a RAM (Random Access Memory), and stores a variety of programs to be used by the present server 10B.

It is to be noted that, also in the present server 10B, an advertisement distribution program according to the present invention (hereinafter referred to as "present program") is activated to control the means within the present server 10B, to realize an advertisement distribution method (hereinafter referred to as "present method") that is described below.

Further, with the use of a computer-readable record medium in which the present program is recorded (hereinafter referred to as "present record medium"), it is possible to function a computer that is not shown in the same manner as the present server 10B. Namely, the computer that is not shown reads the present program from the present record medium and execute the program so that the present method can be realized.

The site manager information DB2B is a storing means of storing advertisement insertion license information including categories and inserting location information that designates an inserting location of an advertisement which were received in the site manager information accepting section 12B.

Further, when the site manager information accepting section 12B receives user attribute information, the site manager information DB2B mutually associates and stores this user attribute information, the categories, and the inserting location information.

FIG. 17 is a pattern diagram showing an example of information stored in the site manager information accepting section 12B. For example, user attribute information, such as a site manager ID, a site ID, URL information, a category section 1, a category section 2, a sex, an age and a distribution area, are mutually associated and stored.

The category section 1 and the category section 2 show sections where advertisements the insertion of which are licensed by the site manager are categorized, and sectionalized in the same manner as the advertisement distributor information DB1. The sex is the sex of the user him/herself, which is shown with "1" in the case of a male, and "2" in the case of a female. The residential area is a residential area (or place of business) of the user him/herself, and sectionalized for example based upon a distribution area section database shown in FIG. 5.

Therefore, in FIG. 17, a Web site with a site ID "HP001", provided by the site manager with a site manager ID "SC001" has a URL: "http://www.abc.co.jp/". It is shown that a section of an advertisement the distribution of which is approved by this site manager with the site manager ID "SC001" belongs to the upper category of "AAA" and the lower category of "aaa", and as for the user attribute designated by an advertisement the insertion of which is licensed by the site manager, the age, sex and the residential area (or place of business) are not restricted. Further, a Web site with a site ID "HP002", provided by the site manager with a site manager ID "SC002" has a URL: "http://www.aaa.co.com/". It is shown that a section of an advertisement the distribution of which is approved by this site manager with the site manager ID "SC002" belongs to the upper category of "BBB" and the lower category of "bbb", and as for the user attribute designated by an advertisement the insertion of which is licensed by the site manager, any of the age, sex and the residential area (or place of business) is not restricted.

The present server 10B may searches the site manager information accepting section 12B with a site ID or the URL information as indexes, so as to read a category section stored as associated with this site ID or the URL information, and the user attribute designated by the advertisement the insertion of which is licensed by the site manager.

The site manager information accepting section 12B is a means of performing a process to receive advertisement insertion license information from the site manager terminal 40. The advertisement insertion license information received in the site manager information accepting section 12B is transmitted to the site manager information DB2B.

Further, the site manager information accepting section 12B also performs a process of receiving a user attribute as the advertisement insertion license information.

The category extracting section 14 is a means of performing a process to extract categories based upon the inserting location information included in the advertisement insertion license information with reference to the site manager information DB2B with the communication site the reading of which is required and which was received in the communication site reading requirement accepting section 13 taken as an inserting location of an advertisement Further, the category extracting section 14 also performs a process of extracting a user attribute along with a category based upon the inserting location information with reference to the site manager information DB2B when the communication site reading requirement accepting section 13 receives a reading requirement.

The categories extracted in the category extracting section 14 are transmitted to the category determining section 15, and meanwhile, the user attribute extracted in the category extracting section 14 is transmitted to the advertisement determining section 16.

The category determining section 15 is a means of performing a process to determine one category out of categories extracted in the category extracting section 14.

Further, the category determining section 15 also performs a process of repeating determination of a category in accordance with the hierarchical number of categories when categories are hierarchically constituted.

One category determined in the category determining section 15 is then transmitted to the advertisement determining section 16.

Moreover, the present server 10B may further have the site information DB3 and the advertisement insertion number specifying section 18.

Further, the present server 10B may have an exposure ratio variation information DB4 and an exposure ratio variation information accepting section 19.

Next, the present method is described with reference to FIG. 18.

FIG. 18 is a sequence diagram showing an example of a second embodiment.

In the second embodiment, an advertisement licensed to be inserted by the site manager is inserted on a Web site.

First, prescribed information such as category section information and distribution area section information is previously stored into the present server 10B.

Subsequently, the advertisement distributor makes an advertisement distribution request from the advertisement distributor terminal 20 to the present server 10E (see (51)).

The present server 10B receives the advertisement distribution request requirement from the advertisement distributor terminal 20, to transmit an advertisement distribution request setting screen to the advertisement distributor terminal 20 in accordance with the received requirement (see (52)).

Next, the advertisement distributor terminal 20 receives the advertisement distribution request setting screen transmitted from the present server 10B, and outputs this screen. This advertisement distribution request setting screen can be represented for example in the form shown in FIG. 10.

The advertisement distributor then inputs prescribed items to be advertisement distribution request information on the advertisement distribution request setting screen in the advertisement distributor terminal 20 and selects a request button, to return an advertisement the distribution of which is requested to the present server 10B along with the advertisement distribution request information (see (53)). At this time, the attribute of the distributing location that designates the distributing location condition for the advertisement can be inputted as the advertisement distribution request information, thereby allowing efficient advertising due to equal distribution of advertisements as objects narrowed down.

The present server 10B receives the advertisement from the advertisement distributor terminal 20 and the advertisement distribution request information (see (54)).

Subsequently, the present server 10B mutually associates the received advertisement and advertisement distribution request information and stores them in the advertisement distributor information DB1 (see (55)).

Next, the present server 10B transmits an advertisement description permission enquiry to the site manager terminal 40 of the site manager who provides a Web site on which an advertisement is requested to be inserted (see (56)).

The site manager terminal 40 accepts input of advertisement insertion license information at least including categories that show sections where an advertisement the insertion of which is licensed by the site manager is categorized and inserting location information that designates an advertisement inserting location in response to reception of the advertisement description permission enquiry, and transmits (returns) the information to the present server 10B (see (57)).

The present server 10B receives the advertisement insertion license information from the site manager terminal 40 (see (58)).

Next, the present server 10B stores the received advertisement insertion license information in the site manager information DB2B (see (59)).

Subsequently, the user makes a requirement for reading a Web site from the user terminal 30B to the present server 10B (see (60)).

The present server 10B receives the requirement for reading a Web site from the user terminal 30B (see (61)).

The present server 10B extracts category information for categorizing advertisements the insertion of which are licensed by the site manager with reference to the site manager information DB2B in response to the requirement for reading a Web site from the user terminal 30B (see (62)).

Subsequently, the present server 10B determines one piece of category information out of the extracted category information (see (63)).

Moreover, the present server 10B determines one advertisement out of the advertisements that belong to the determined category information with reference to the advertisement distributor information DB1 after determination of the category information (see (64)).

Thereafter, the present server 10B transmits the determined advertisement to the user terminal 30B along with information of the Web site the reading of which is required (see (65)).

The user terminal 30B receives the Web site information and the advertisement which were transmitted from the present server 10B (see (66)).

The user terminal 30B then outputs and displays the received Web site information and advertisement as a Web site screen with this advertisement inserted thereon (see (67)).

This allows the user to read a Web site screen with a specific advertisement inserted thereon which belongs to the category the insertion of which is licensed by the site manager.

Next, an example of basic operation's of the present server 10B having the configuration as thus described is described with reference to FIGS. 19 and 20. FIG. 19 is a flowchart showing a flow of processing in the present server 10B that executes the second embodiment, and FIG. 20 is a flowchart showing a sequence thereto.

As shown in FIGS. 19 and 20, first, the advertisement distribution request accepting section 11 determines whether or not an advertisement distribution request requirement has been received from the advertisement distributor terminal 20 (S51).

When the advertisement distribution request accepting section 11 has received the advertisement distribution request requirement (Y), subsequently, the advertisement distribution request accepting section 11 transmits (returns) an advertisement distribution request setting screen to the advertisement distributor terminal 20 in response to reception of the advertisement distribution request requirement (S52).

On the other hand, when the advertisement distribution request accepting section 11 has not received the advertisement distribution request requirement (N), or after the advertisement distribution request accepting section 11 has transmitted the advertisement distribution request setting screen, the advertisement distribution request accepting section 11 determines whether or not an advertisement the distribution of which is requested and advertisement distribution request information, at least including category information that shows sections where this advertisement is categorized, have been received from the advertisement distributor terminal 20 (S53).

As a result of that, when the advertisement distribution request accepting section 11 receives the advertisement and the advertisement distribution request information (Y), the advertisement distribution request accepting section 11 transmits the received advertisement and advertisement distribution request information to the advertisement distributor information DB1.

The advertisement distributor information DB1 mutually attributes and stores the advertisement and advertisement distribution request information which were transmitted from the advertisement distribution request accepting section 11 (S54).

Next, the site manager information accepting section 12B transmits an advertisement insertion permission inquiry for registering the advertisement insertion license information including categories that show sections where advertisements the insertion of which are licensed by the site manager are categorized and the advertisement information that designates advertisement inserting locations (S55).

Further, when the advertisement distribution request accepting section 11 has not received the advertisement and the advertisement distribution request information (N), or after the site manager information accepting section 12B has transmitted the advertisement insertion permission inquiry to the site manager terminal 40, the site manager information accepting section 12B next determines whether or not advertisement insertion license information has been received from the site manager terminal 40 (S56).

As a result of that, when the site manager information accepting section 12B has received the advertisement insertion license information, the site manager information accepting section 12B transmits the received advertisement insertion license information to the site manager information DB2B.

The site manager information DB2B stores the advertisement insertion license information transmitted from the site manager information accepting section 12B (S57)

On the other hand, when the site manager information accepting section 12B has not received the advertisement insertion license information (N), the communication site reading requirement accepting section 13 next determines whether or not a Web site reading requirement has been received from the user terminal 30B (S58).

As a result of that, when the communication site reading requirement accepting section 13 has received the Web site reading requirement (Y), the communication site reading requirement accepting section 13 transmits the information to the advertisement insertion number specifying section 18 and the category extracting section 14.

The advertisement insertion number specifying section 18 then acquires Web site information from the received reading requirement in accordance with information of reception of the reading requirement transmitted from the communication site reading requirement accepting section 13, and the advertisement insertion number specifying section 18 further specifies the number of advertisement insertion frames based upon the Web site information with reference to the site information DB3, to transmit this information of the number of insertion frames to the category determining section 15 (S59).

Further, the category extracting section 14 extracts category information based upon the inserting location information with reference to the site manager information DB2B with a Web site the reading of which is requested taken as an advertisement inserting location in accordance with information of reception of the reading requirement transmitted from the communication site reading requirement accepting section 13, to transmit all the extracted category information to the category determining section 15 (S60).

On the other hand, when the communication site reading requirement accepting section 13 has not received the request for reading a Web site (N), the advertisement distribution request accepting section 11 repeats determination as to whether or not the advertisement distribution request requirement has received from the advertisement distributor terminal 20 (S51).

The category determining section 15 allocates unique numbers to all the category information accepted in the category extracting section 14, to determine one piece of category information as an object to be displayed by the use of random numbers (S61).

Next, the category determining section 15 determines whether or not there is lower-level (lower) category information under the determined category information with reference to the advertisement distributor information DB1 (S62).

As a result of that, when there is no lower-level (lower) category information under the determined category (Y), the category determining section 15 transmits the determined category information to the advertisement determining section 16 along with the information of the number of insertion frames accepted from the advertisement insertion number specifying Section 18. The category determining section 15 then repeats determination of category information if necessary in accordance with the information of the number of insertion frames.

On the other hand, when there is lower-level (Lower) category information under the determined category (N), the category determining section 15 allocates unique numbers to all the category information included immediately under the determined category information, to determine one piece of category information out of all the category information to be displayed by the use of random numbers (S61).

when accepting the category information from the category determining section 15, the advertisement determining section 16 confirms exposure ratio variation information with reference to the exposure ratio variation information DB4, and extracts all corresponding advertisements based upon the accepted category information with reference to the advertisement distributor information DB1, allocates unique numbers to all the extracted advertisements based upon the confirmed exposure ratio variation information, extracts one advertisement as an object to be displayed by the use of random numbers, to determine an advertisement to be displayed (S63). The determined advertisement is temporarily stored in the advertisement determining section 16.

Subsequently, after advertisement determination, the advertisement determining section 16 determines whether or not the determined advertisement is an undetermined advertisement, namely whether the determined advertisement is not a redundantly determined advertisement, with reference to already determined advertisements which are temporarily stored (S64).

As a result of that, when the determined advertisement is an undetermined advertisement, namely the advertisement has not been determined as an advertisement to be inserted on (transmitted to) the corresponding Web site (X), the advertisement determining section 16 next determines whether or not the number of the determined advertisements is equivalent to the number of advertisement insertion frames based upon the information of the number of insertion frames accepted along with the category information (S65).

On the other hand, when the determined advertisement is an already determined advertisement (N), the advertisement determining section 16 again repeats determination of one advertisement (S63).

Further, as a result of determining whether or not the number of determined advertisements is equivalent to the number of advertisement insertion frames, when both numbers are equivalent (Y), all the determined advertisements are transmitted to the advertisement distributing section 17, and the advertisement distributing section 17 transmits the accepted (determined) advertisements to the user terminal along with information of a communication site the reading of which is required (S66).

On the other hand, when the number of the transmitted advertisements and the number of advertisement insertion frames are not equivalent (N), the category extracting section 14 extracts category information based upon the inserting location information with reference to the site manager information DB2B, and repeats transmission of all the extracted category information to the category determining section 15 (S60).

Thereby, a series of basic operations in the present server 10B are ended.

As described above, the present server 10B is capable of selecting and determining a specific advertisement that belongs to a category the insertion of which is licensed by the site manager out of a large number of advertisements that belong to a large number of categories, to provide the determined advertisement to the user. Namely, the present server 10B equally selects one category out of categories belonged to by advertisements the insertion of which is licensed by the site manager, and further equally selects an advertisement included in the selected category, to distribute the selected advertisement to a Web site screen to be read by the user.

Accordingly, as in the first embodiment, unbalanced insertion of the same categories or the same advertisements on the Web site screen to be read by the user is prevented to allow the advertisement distributor to equally distribute advertisements even when advertisements belong to a category with a small number of advertisements or when the user corresponds to an unexpected attribute, and it is thereby possible to prevent loss of advertising opportunities, decreases in impression of and interest in advertisements, and occurrence of a feeling of repulsion thereto, so as to efficiently achieve promotion of sales activities.

In addition to the foregoing embodiments, the usage time of each user per each of Web pages constituting a Web site may be acquired on a server side, and an advertisement with high exposure ratio may be preferentially displayed when the user is watching a Web page with a long usage time.

For example, assuming that there is a page for transmitting and receiving e-mails, a page for managing a schedule, and an electronic bulletin board page, and a user A watches the e-mail page for five hours a day, the schedule page for two hours a day, and the electronic bulletin board page for an hour a day, a calculation is conducted added with a weighted coefficient such that an advertisement with a high exposure ratio is selected more frequently.

It is thereby possible to provide a page most frequently used with an advertisement with a high exposure ratio.

The invention claimed is:

1. An advertisement distribution system to insert a specific advertisement on a communication site screen to be read by a user through a network, comprising:
   an advertisement distributor terminal that is used by an advertisement distributor who requests distribution of said advertisement;
   a site manager terminal that is used by a site manager who provides a communication site to be read by said user;
   a user terminal that is used by the user who reads a communication site with said advertisement inserted thereon; and
   an advertisement distribution management device communicably connected with said advertisement distributor terminal, said site manager terminal and said user terminal through the network,
   wherein
   said advertisement distributor terminal has
   an advertisement distribution requesting device of accepting input of advertisement distribution request information at least including category information that shows sections where an advertisement the distribution of which is requested is categorized, along with this advertisement, to transmit the information and the advertisement to the advertisement distribution management device,
   said site manager terminal has
   an advertisement insertion licensed site designating device of accepting input of advertisement insertion license information at least including category information that shows sections where an advertisement the insertion of which is licensed by the site manager is categorized and inserting location information that designates an advertisement inserting location, to transmit the inputted information to the advertisement distribution management device, said user terminal at least has:
   a communication site reading requiring device of accepting a requirement for reading a communication site, to transmit the requirement to the advertisement distribution management device; and
   a communication site displaying device of receiving an advertisement determined based upon the advertisement insertion license information and information of the communication site the reading of which is required from the advertisement distribution management device, to display a site screen with this advertisement inserted thereon, and
   the advertisement distribution management device at least has:
   an exposure ratio variation information storing device of associating exposure ratio variation information, with the advertisement and the advertisement distribution request information received in the advertisement distribution request accepting device, said variation information increasing an exposure ratio of said advertisement, to store the variation information;
   an advertisement distribution request accepting device of receiving the advertisement and the advertisement distribution request information from the advertisement distributor terminal;
   an advertisement distributor information storing device of mutually associating and storing the advertisement and the advertisement distribution request information which were received in the advertisement distribution request accepting device;

a site information storing device of previously mutually associating and storing communication site information and information of the number of insertion frames for advertisements to be inserted on the communication site screen;

a site manager information accepting device of receiving the advertisement insertion license information from the site manager terminal;

a site manager information storing device of storing the advertisement insertion license information received in the site manager information accepting device;

a communication site reading requirement accepting device of receiving the requirement for reading a communication site from the user terminal;

an advertisement inserted number specifying device of acquiring site information in response to reception of a requirement for reading a communication site in said communication site reading requirement accepting device, to acquire information of the number of insertion frames for advertisements to be inserted on said communication site screen with reference to said site information storing device;

a category extracting device of extracting category information based upon inserting location information with reference to the site manager information storing device with the communication site, which was received in the communication site reading requirement accepting device and the reading of which is required, taken as the advertisement inserting location;

a category determining device of allocating unique numbers to a plurality of pieces of extracted category information and repeating determination of category information out of those numbers by the use of random numbers in accordance with the number of advertisement insertion frames specified in said advertisement inserted number specifying device, to determine category information as an object to be displayed in accordance with the number of advertisement insertion frames;

an advertisement determining device of; acquiring all advertisements belonging to said category information determined in said category determining device per each of said determined advertisement insertion frames with reference to said advertisement distributor information storing device after determination of the category information in said category determining device, and also increasing the probability of selection of advertisement information in accordance with the exposure ratio variation information set with respect to the advertisement with reference to said exposure ratio variation information storing device, so as to select and determine an advertisement to be displayed; and an advertisement distributing device of transmitting the determined advertisement to said user terminal along with the information of the communication site the reading of which is required.

2. An advertisement distribution management device, which is connected through a communication network with an advertisement distributor terminal that is used by an advertisement distributor who requests distribution of an advertisement, a site manager terminal that is used by a site manager who provides a communication site to be read by said user, and a user terminal that is used by a user who reads a communication site with the advertisement inserted thereon, and inserts a specific advertisement on a communication site screen to be read by the user through the network, said device at least having:

an exposure ratio variation information storing, device of associating exposure ratio variation information, with the advertisement and the advertisement distribution request information received in the advertisement distribution request accepting device, said variation information increasing an exposure ratio of said advertisement, to store the variation information;

a site information storing device of previously mutually associating and storing communication site information and information of the number of insertion frames for advertisements to be inserted on the communication site screen;

an advertisement distribution request accepting device of receiving from said advertisement distributor terminal an advertisement the distribution of which is requested and advertisement distribution request information at least including category information that shows sections where this advertisement is categorized;

an advertisement distributor information storing device of mutually associating and storing the advertisement and the advertisement distribution request information which were received in the advertisement distribution request accepting device;

a site manager information accepting device of receiving from the site manager terminal advertisement insertion license information at least including category information that shows sections where an advertisement the insertion of which is licensed by the site manager is categorized and inserting location information that designates an advertisement inserting location;

a site manager information storing device of storing the advertisement insertion license information received in the site manager information accepting device;

a communication site reading requirement accepting device of receiving a requirement for reading a communication site from the user terminal;

an advertisement inserted number specifying device of acquiring site information in response to reception of a requirement for reading a communication site in said communication site reading requirement accepting device, to acquire information of the number of insertion frames for advertisements to be inserted on said communication site screen with reference to said site information storing device;

a category extracting device of acquiring the user identification information from the reading requirement received in said communication site reading requirement accepting device, to extract category information based upon this identification information with reference to said user information storing device;

a category determining device of allocating unique numbers to a plurality of pieces of extracted category information and repeating determination of category information out of those numbers by the use of random numbers in accordance with the number of advertisement insertion frames specified in said advertisement inserted number specifying device, to determine category information as an object to be displayed in accordance with the number of advertisement insertion frames;

an advertisement determining device acquiring all advertisements belonging to said category information determined in said category determining device per each of said determined advertisement insertion frames with reference to said advertisement distributor information storing device after determination of the category information in said category determining device, and also increasing the probability of selection of advertisement information in accordance with the exposure ratio variation information set with respect to the advertisement with reference to said exposure ratio variation information storing device, so as to select and determine an advertisement to be displayed; and an advertisement distributing device of transmitting the determined advertisement to said user terminal along with the information of the communication site the reading of which is required.

3. The advertisement distribution management device according to claim 2, wherein, said advertisement distributor information storing device hierarchically stores the category information received in the advertisement distribution request accepting device, and said category determining device repeats determination of category information in accordance with the number of levels of the category information.

4. The advertisement distribution management device according to claim 2, wherein said advertisement distribution request accepting device further receives distributing location attribute information that designates a distributing location condition for an advertisement as the advertisement distribution request information, said advertisement distributor information storing device mutually associates and stores the distributing location attribute information and the advertisement which were received in the advertisement distribution request accepting device, said site manager information accepting device further receives user attribute information as the advertisement insertion license information, said site manager information storing device mutually associates and stores the user attribute information, the category information and the inserting location information which were received in the site manager information accepting device, said category extracting device further extracts the user attribute information along with the category information with reference to the site manager information storing device, and said advertisement determining device determines one advertisement having a distribution attribute complying with said user attribute information out of advertisements that belong to the determined category information with respect to the advertisement distributor information storing device.

5. The advertisement distribution management device according to claim 4, wherein, said advertisement distributor information storing device hierarchically stores the category information received in the advertisement distribution request accepting device, and said category determining device repeats determination of category information in accordance with the number of levels of the category information.

\* \* \* \* \*